United States Patent
Sasaki et al.

(10) Patent No.: US 7,082,384 B2
(45) Date of Patent: Jul. 25, 2006

(54) MAINTENANCE SUPPORT METHOD, STORAGE MEDIUM, AND MAINTENANCE SUPPORT APPARATUS

(75) Inventors: Keiichi Sasaki, Tokyo (JP); Akira Sawada, Kiyose (JP); Shigehito Kodera, Machida (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 34 days.

(21) Appl. No.: 11/007,759

(22) Filed: Dec. 9, 2004

(65) Prior Publication Data
US 2005/0149570 A1 Jul. 7, 2005

(30) Foreign Application Priority Data
Dec. 19, 2003 (JP) .............................. 2003-422394

(51) Int. Cl.
*G06F 19/00* (2006.01)
(52) U.S. Cl. ........................................ 702/184; 714/25
(58) Field of Classification Search ................ 702/184, 702/185, 188; 714/2, 25
See application file for complete search history.

(56) References Cited

U.S. PATENT DOCUMENTS
5,596,712 A 1/1997 Tsuyama et al.

FOREIGN PATENT DOCUMENTS

| JP | 62-276470 | 12/1987 |
|---|---|---|
| JP | 11-119823 | 4/1999 |
| JP | 2002-73155 | 3/2002 |
| JP | 2002-123314 | 4/2002 |

*Primary Examiner*—Edward Raymond
(74) *Attorney, Agent, or Firm*—Finnegan, Henderson, Farabow, Garrett & Dunner, L.L.P.

(57) ABSTRACT

In an embodiment of this invention, a diagnosis engine refers to a risk assessment DB and anti-risk measure DB, calculates along the time sequence a risk estimate amount in case of failure for each device and a maintenance cost in executing a measure method in advance, and adds the risk estimate amount and maintenance cost along the time sequence to calculate an optimum maintenance period of the device. When a failure has occurred in the device, the diagnosis engine refers to a failure diagnosis DB on the basis of the identification information of the device and the failure mode and analyzes, on the basis of an operation record, a failure which is different from a secular change.

12 Claims, 22 Drawing Sheets

| | Event 1 | Event 2 | Event 3 | ...... |
|---|---|---|---|---|
| Product name | | | | |
| Model name and type | | | | |
| User name | | | | |
| Site name | | | | |
| Delivery day (working day) | | | | |
| Working day | | | | |
| Name and type of target part | | | | |
| Occurrence day | | | | |
| Reception day | | | | |
| Recovery day | | | | |
| Machine installation environment condition | | | | |
| Failure mode | | | | |
| Failure cause | | | | |
| Failure sign phenomenon | | | | |
| MTBF | | | | |
| MTTF | | | | |
| Measure / maintenance method | | | | |
| Required time | | | | |
| Necessary number of persons | | | | |
| Labor cost unit price | | | | |
| User equipment stop loss | | | | |
| Quantity of repair part and material | | | | |
| Unit price of repair part and material | | | | |

| | Machine DB | Part DB | Use environment DB | Anti-risk measure DB ||||| 
|---|---|---|---|---|---|---|---|---|
| | | | | Failure mode DB | Trouble analysis result DB | Measure method DB | Post-measure situation DB | Measure record DB |
| Product name | ○ | | | ○ | ○ | ○ | ○ | ○ |
| Model name and type | ○ | ○ | | ○ | ○ | ○ | ○ | ○ |
| User name | | | ○ | | | ○ | ○ | ○ |
| Site name | | | ○ | | | | | |
| Name and type of target part | ○ | | | ○ | ○ | ○ | ○ | ○ |
| Failure occurrence day | | | | | | | ○ | |
| Failure reception day | | | | | | | ○ | |
| Recovery day | | | | | | | ○ | |
| Installation environment | | | ○ | | | | | |
| Failure mode | | | | ○ | ○ | ○ | | |
| Failure cause | | | | ○ | ○ | | | |
| Failure sign | | | | ○ | ○ | | | |
| MTBF | | | | | ○ | | | |
| MTTF | | | | | ○ | | | |
| Measure / maintenance method | | | | | | ○ | ○ | ○ |
| Required time | | | | | | | | ○ |
| Necessary number of persons | | | | | | ○ | | ○ |

| | Customer DB | Use time DB | Model DB | Part DB | Part unit price DB | Inventory DB | Delivery time DB | Event (phenomenon) DB | Occurrence probability DB | Effect degree DB | Personnel DB | Labor cost DB |
|---|---|---|---|---|---|---|---|---|---|---|---|---|
| Product name | O | O | O | | | | | | | | | |
| Model name and type | O | O | O | | | | | | | | | |
| User name | O | O | | | | | | | | | | |
| Site name | O | | | | | | | | | | | |
| Delivery day | | O | | | | | | | | | | |
| Working day | | O | | | | | | | | | | |
| Name and type of target part | | | O | O | O | O | O | | | | | |
| Failure occurrence day | | O | | | | | | | | | | |
| Failure reception day | | O | | | | | | | | | | |
| Recovery day | | O | | | | | | | | | | |
| Installation environment | O | | | | | | | | | | | |
| Failure mode | | | | | | | | O | O | | | |
| Failure cause | | | | | | | | O | | | | |
| Failure sign | | | | | | | | O | | | | |
| MTBF | | | | | | | | | O | | | |
| MTTF | | | | | | | | | O | | | |
| Measure / maintenance method | | | | | | | | | | O | O | |
| Required time | | | | | | | | | | | O | O |
| Necessary number of persons | | | | | | | | | | | | O |
| Labor cost unit price | | | | | | | | | | | | O |
| Equipment stop loss | | | | | | | | | | O | | |
| Quantity of repair part and material | | | | | | | | | | O | | |
| Unit price of repair part and material | | | | | O | | | | | | | |

Risk assessment DB — 22

FIG. 6

| Type of part | Failure mode | Occurrence count |
|---|---|---|
| Electrolytic capacitor | Liquid leakage | 11 |
| | Reduced capacity | 52 |
| Metal winding resistance | Wire breaking | 4 |
| Miniature relay | High contact resistance | 48 |
| | Contact deposition | 2 |
| | Coil break | 3 |
| Lithium storage battery | High internal resistance | 28 |
| | Low output voltage | 31 |
| Board wiring pattern | Insulation degradation | 15 |
| ⋮ | ⋮ | ⋮ |

| No. | Industrial category | Customer name | System name | Equipment name | Model name | Failure portion | Failure mode | Failure occurrence day | Delivery day | Failure occurrence time | Failure cause superordinate classification | Part name | Type |
|---|---|---|---|---|---|---|---|---|---|---|---|---|---|
| 1 | Food | A industry | Management software | Water treatment | Serial I/O | X1 | Logic failure | 1993/9/2 | 1989/10/26 | 33768 | Degradation by voltage application | Cmos | 74 |
| 2 | Electric machine | K center | Combustion equipment | Furnace instrumentation | AD_M | X511 | Logic failure | 2001/10/11 | 1996/2/25 | 49080 | Degradation by voltage application | Cmos | 74H |
| 3 | Motor vehicle | B motor | Assembly system | Manufacturing line | PC5000 | Wiring | Disconnection | 2002/7/23 | 1991/2/1 | 100560 | Environmental degradation | Board | H100 |
| 4 | | | | | | | | | | | | | |
| 5 | | | | | | | | | | | | | |
| 6 | | | | | | | | | | | | | |
| 7 | | | | | | | | | | | | | |
| 8 | | | | | | | | | | | | | |
| 9 | | | | | | | | | | | | | |
| 10 | | | | | | | | | | | | | |
| 11 | | | | | | | | | | | | | |
| 12 | | | | | | | | | | | | | |
| 13 | | | | | | | | | | | | | |
| 14 | | | | | | | | | | | | | |
| 15 | | | | | | | | | | | | | |

| No. | Product name | Type | Part name | Type | Shipment date/time | Number of shipped units | Customer name |
|---|---|---|---|---|---|---|---|
| 1 | AD-M | M | Cmos | 74H | 1996/2/25 | 21 | K center |
| 2 | Manufacturing line | ML | Board | B100 | 1991/2/1 | 3 | B motor |
| ... | ... | ... | ... | ... | ... | ... | ... |

| Customer name | Line number | Part identification information | Failure occurrence time or normal working time | Failure···1 Normal···0 $\delta i$ | Number of population Ni | 1 / Ni | H(t) | R(t) | F(t) |
|---|---|---|---|---|---|---|---|---|---|
| A industry | 1 | 2116 | 3336 | 1 | 32 | 0.031 | 0.031 | 0.969 | 0.031 |
| | 2 | 3782 | 4296 | 1 | 31 | 0.032 | 0.064 | 0.938 | 0.062 |
| | 3 | 2834 | 7920 | 0 | 30 | 0.000 | 0.064 | 0.938 | 0.062 |
| | 4 | 4540 | 8496 | 0 | 29 | 0.000 | 0.064 | 0.938 | 0.062 |
| | 5 | 2474 | 10656 | 1 | 28 | 0.036 | 0.099 | 0.906 | 0.094 |
| | 6 | 4507 | 11400 | 1 | 27 | 0.037 | 0.136 | 0.873 | 0.127 |
| | 7 | 2194 | 13824 | 1 | 26 | 0.038 | 0.175 | 0.840 | 0.160 |
| | 8 | 1513 | 14304 | 0 | 25 | 0.000 | 0.175 | 0.840 | 0.160 |
| | 9 | 3833 | 19296 | 1 | 24 | 0.042 | 0.216 | 0.805 | 0.195 |
| | 10 | 1684 | 20448 | 1 | 23 | 0.043 | 0.260 | 0.771 | 0.229 |
| | 11 | 3750 | 21480 | 1 | 22 | 0.045 | 0.305 | 0.737 | 0.263 |
| | 12 | 1342 | 21552 | 1 | 21 | 0.048 | 0.353 | 0.703 | 0.297 |
| | 13 | 3251 | 22392 | 0 | 20 | 0.000 | 0.353 | 0.703 | 0.297 |
| | 14 | 1142 | 25800 | 1 | 19 | 0.053 | 0.406 | 0.667 | 0.333 |
| | 15 | 1541 | 32112 | 1 | 18 | 0.056 | 0.461 | 0.631 | 0.369 |
| | 16 | 657 | 32352 | 0 | 17 | 0.000 | 0.461 | 0.631 | 0.369 |
| | 17 | 1014 | 37728 | 0 | 16 | 0.000 | 0.461 | 0.631 | 0.369 |
| | 18 | 2526 | 37728 | 0 | 15 | 0.000 | 0.461 | 0.631 | 0.369 |
| | 19 | 3523 | 37920 | 1 | 14 | 0.071 | 0.533 | 0.587 | 0.413 |
| | 20 | 1124 | 43200 | 1 | 13 | 0.077 | 0.609 | 0.544 | 0.456 |
| | 21 | 447 | 46320 | 0 | 12 | 0.000 | 0.609 | 0.544 | 0.456 |
| | 22 | 3381 | 48648 | 1 | 11 | 0.091 | 0.700 | 0.496 | 0.504 |
| | 23 | 2028 | 56184 | 1 | 10 | 0.100 | 0.800 | 0.449 | 0.551 |
| | 24 | 417 | 58536 | 1 | 9 | 0.111 | 0.911 | 0.402 | 0.598 |
| | 25 | 1003 | 59280 | 0 | 8 | 0.000 | 0.911 | 0.402 | 0.598 |
| | 26 | 916 | 61512 | 1 | 7 | 0.143 | 1.054 | 0.348 | 0.652 |
| | 27 | 973 | 67848 | 0 | 6 | 0.000 | 1.054 | 0.348 | 0.652 |
| | 28 | 991 | 72552 | 1 | 5 | 0.200 | 1.254 | 0.285 | 0.715 |
| | 29 | 936 | 75288 | 0 | 4 | 0.000 | 1.254 | 0.285 | 0.715 |
| | 30 | 482 | 80832 | 1 | 3 | 0.333 | 1.588 | 0.204 | 0.796 |
| | 31 | 41 | 81432 | 1 | 2 | 0.500 | 2.088 | 0.124 | 0.876 |
| | 32 | 197 | 88464 | 1 | 1 | 1.000 | 3.088 | 0.046 | 0.954 |

FIG. 29

MAINTENANCE SUPPORT METHOD, STORAGE MEDIUM, AND MAINTENANCE SUPPORT APPARATUS

CROSS-REFERENCE TO RELATED APPLICATIONS

This application is based upon and claims the benefit of priority from prior Japanese Patent Application No. 2003-422394, filed Dec. 19, 2003, the entire contents of which are incorporated herein by reference.

BACKGROUND OF THE INVENTION

1. Field of the Invention

The present invention relates to a maintenance support method, storage medium, and maintenance support apparatus which support maintenance of devices.

2. Description of the Related Art

TBM (Time Based Maintenance) is a maintenance diagnosis method for a device (e.g., an electric device) or equipment (e.g., a plant). In TBM, maintenance is done periodically in accordance with a check period determined for each device type independently of the device installation environment or the degree of degradation.

As an advantage of TBM, the maintenance plan is easy to determine. For example, a device or equipment manufacturer sets a maintenance period for each product it supplies. The manufacturer guarantees for users to ensure replacement parts or undertake maintenance after the supply time until the maintenance period ends.

The maintenance period is determined as a form of a predetermined period from the manufacture of the device or equipment or a predetermined period from stop of the manufacture of the model. The maintenance period is determined on the basis of the replacement part suppliable period or maintenance personnel workable period.

In TBM, check is done even when the device installation environment is good, and the degree of degradation is low. Hence, TBM is disadvantageous because it wastefully decreases the utilization of the device and increases the maintenance cost.

As other drawbacks of TBM, if the device installation environment is worse than expected, and the materials or parts easily degrade, the check period is too long, and failures may frequently occur.

Because of these disadvantages, applying TBM unconditionally for each device type is not always preferable.

The number of deteriorating devices or equipment is increasing recently. The users of devices and equipment want their operation costs to minimize.

A method of optimizing maintenance is CBM (Condition Based Maintenance). In CBM, the user of each device confirms the operation state or degree of degradation. The check period or check items are selected by the user of each device, thereby optimizing maintenance.

A method of minimizing the operation cost of the life cycle of each device is RBM (Risk Based Maintenance). In RBM, the operation cost of the life cycle of each device is minimized in consideration of tradeoff between the operation risk and the maintenance cost of the device.

The user of a device tries to optimize the maintenance method by using CBM or RBM. As a result, the number of times of maintenance is decreased, or the maintenance period is extended. Accordingly, the life cycle cost is decreased, and the reliability of the device or equipment is maintained.

Reference 1 (Jpn. Pat. Appln. KOKAI Publication No. 2002-73155) discloses a technique to allow a user to execute maintenance management corresponding to the remaining life. A plant operational limit is obtained such that it does not exceed a plant risk estimate value obtained by multiplying a fracture probability by a weight coefficient. In addition, a plant risk operation estimate value is obtained from prediction of the current remaining life and prospective remaining life.

Reference 2 (Jpn. Pat. Appln. KOKAI Publication No. 2002-123314) discloses a technique which quantitatively evaluates the risk of a maintenance portion on the basis of the antipersonnel risk, function loss risk, and environmental risk, calculates the reconstruction cost and the loss in case of failure, thereby avoiding excessive maintenance.

Reference 3 (Jpn. Pat. Appln. KOKAI Publication No. 11-119823) discloses a technique which associates failure events and failure factors on a matrix to implement accurate failure diagnosis.

The above-described maintenance support methods aim at optimizing the maintenance method. However, no concrete optimization method has been established yet.

In addition, the present states of the techniques described in references 1 to 3 are as follows.

The technique of reference 1 executes maintenance management corresponding to the remaining life. In the technique of reference 1, however, the maintenance period is not optimized.

The technique of reference 2 avoids excessive maintenance. With the technique of reference 2, basically, assessments at planning are obtained. For optimization of the maintenance method, however, reference 2 only describes an outline of reappraisal of the maintenance method and period (S10). In the technique of reference 2, the degradation by a secular change is analyzed. However, no detailed description has been made about analysis of failures except the secular change in the technique of reference 2.

The technique of reference 3 implements accurate failure diagnosis. However, the technique of reference 3 cannot optimize the maintenance period.

BRIEF SUMMARY OF THE INVENTION

In an embodiment of this invention, a maintenance support method of causing a database creation unit (30) and a diagnosis engine (40) to support maintenance of a device on the basis of equipment maintenance information (10) to manage an operation record containing a working record, a failure record, and a renewal record of the device, comprising:

causing the database creation unit (30) to create a risk assessment database (22) in which "device part unit price", "maintenance personnel data", "labor cost unit price data", and "equipment stop loss for failure mode", which are related to the working record contained in the equipment maintenance information (10), and "failure mode" and "failure occurrence frequency", which are related to the failure record, are associated with identification information of the device (S1);

causing the database creation unit (30) to create an anti-risk measure database (21) in which "failure mode" related to the failure record contained in the equipment maintenance information (10) and "measure method for failure mode" related to the renewal record are associated with the identification information of the device and identification information of each part of the device (S2);

causing the database creation unit (30) to execute at least one of event tree analysis and failure tree analysis for each part of the device on the basis of the identification information of each part of the device and the failure mode contained in the equipment maintenance information (10) and acquire an analysis result (S3);

causing the database creation unit (30) to create a failure diagnosis database (23) in which "failure occurrence frequency", "failure sign phenomenon", and "failure cause" contained in the equipment maintenance information (10) are associated with the identification information of the device and the identification information of each part of the device for the analysis result and each failure mode in the analysis result (S4);

causing the diagnosis engine (40) to refer to the risk assessment database (22) and the anti-risk measure database (21) before a failure occurs in the device and calculate along a time sequence a risk estimate amount in case of failure for each device on the basis of the failure occurrence frequency and the equipment stop loss (S5);

causing the diagnosis engine (40) to refer to the risk assessment database (22) and the anti-risk measure database (21) before a failure occurs in the device and calculate along the time sequence a maintenance cost in executing a measure method for each device in advance on the basis of the failure occurrence frequency, the measure method, the device part unit price, the personnel data, and the labor cost unit price data (S6);

causing the diagnosis engine (40) to output, as a maintenance period, a time point at which a sum obtained by adding the risk estimate amount and the maintenance cost along the time sequence is minimized (S7); and causing the diagnosis engine (40) to refer to the failure diagnosis database (23) on the basis of the identification information of the device and the failure mode when a failure has occurred in the device (S8) and output at least one of a failure cause and a failure sign obtained as a result of reference (S9).

The above-described aspects are implemented as a method. However, the present invention is not limited to this. The above-described aspects may be implemented as an apparatus or a computer-readable storage medium.

BRIEF DESCRIPTION OF THE SEVERAL VIEWS OF THE DRAWING

FIG. 2 is a view showing an example of the data structure of an equipment maintenance information DB;

FIG. 4 is a view showing an example of the data structure of the anti-risk measure DB;

FIG. 6 is a view showing an example of the data structure of the risk assessment DB;

FIG. 27 is a view showing an example of the data structure of equipment maintenance extraction information;

FIG. 28 is a view showing an example of the data structure of shipment extraction information;

FIG. 29 is a view showing the first example of the data structure of reliability analysis information;

DETAILED DESCRIPTION OF THE INVENTION

Figure 1:
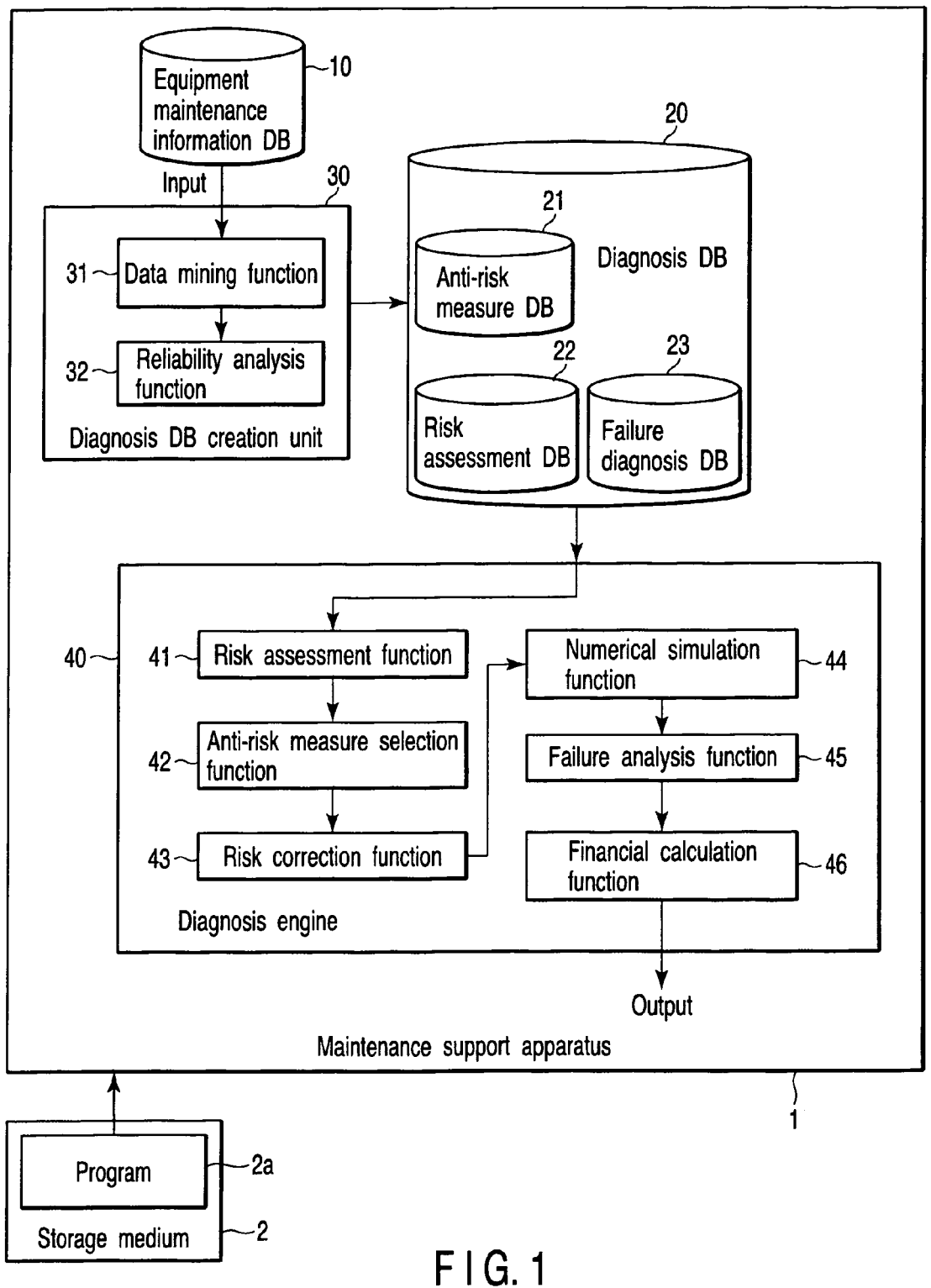
FIG. 1 is a block diagram showing an example of the arrangement of a maintenance support apparatus according to the first embodiment of the present invention.

The embodiments will be described below with reference to the accompanying drawing. The same reference numerals denote the same elements throughout the drawing, and a description thereof will be omitted.

(First Embodiment)

FIG. 1 is a functional block diagram showing an example of the arrangement of a maintenance support apparatus according to the first embodiment.

A maintenance support apparatus 1 comprises an equipment maintenance information DB (Database) 10, diagnosis DB 20, diagnosis database creation unit (database creation device) 30, and diagnosis engine 40.

The diagnosis DB creation unit 30 and diagnosis engine 40 may be either an integrated unit or separate units. Each of the diagnosis DB creation unit 30 and diagnosis engine 40 is implemented by a combination of a hardware configuration and software configuration. The software configuration is implemented by installing in advance a program 2a to implement the function of the diagnosis DB creation unit 30 and diagnosis engine 40 from a storage medium 2 or network to the computer in the maintenance support apparatus 1.

The equipment maintenance information DB 10 is a storage device readable from the diagnosis DB creation unit 30. FIG. 2 is a view showing an example of the data structure of the equipment maintenance information DB 10. The equipment maintenance information is information to manage, for each device, the operation record including the working record, failure record, and renewal record. As the equipment maintenance information, contents fed back from the working site of the device are stored.

The equipment maintenance information contains, e.g., product name, model name and type of the device, names and types of parts of the device, working days of the device and parts, failure occurrence day, failure reception day, recovery day, customer name (user name), site name, device installation environment conditions (e.g., temperature, humidity, corrosive gas concentration, dustfall quantity, sea salt particle concentration, and metallic corrosion quantity), failure modes, occurrence frequency of each failure mode, failure cause, failure sign phenomenon, mean time between failures (MTBF), mean time to failure (MTTF), maintenance method for each device and failure mode, time required for maintenance, necessary number of persons, labor cost unit price, customer-side equipment stop loss (per unit time), and quantities and unit prices of repair parts and materials.

The product name and the model name and type of the device are used as the identification information of the device. The names and types of parts of the device are used as identification information of the parts of the devices.

If there are a plurality of devices or parts of the same specifications, the serial number of the device or an identification number assigned by the user is used as the identification information of the device.

The diagnosis DB 20 is a storage device readable/writable from the diagnosis DB creation unit 30 and diagnosis engine 40. The diagnosis DB 20 comprises an anti-risk measure DB 21, risk assessment DB 22, and failure diagnosis DB 23.

The anti-risk measure DB 21 only needs to store a failure mode related to the failure record contained in the equipment maintenance information and a measure method for each failure mode related to the renewal record in association with the identification information of the device and the identification information of the parts of the device. More specifically, the anti-risk measure DB 21 stores, e.g., product name, model name and type, user name, site name, target part name and type, failure occurrence day, failure reception day, recovery day, installation environment condition, failure mode, failure cause, failure sign phenomenon, MTBF, MTTF, maintenance method for each device and failure mode, time required for maintenance, and necessary number of persons.

Figure 3:
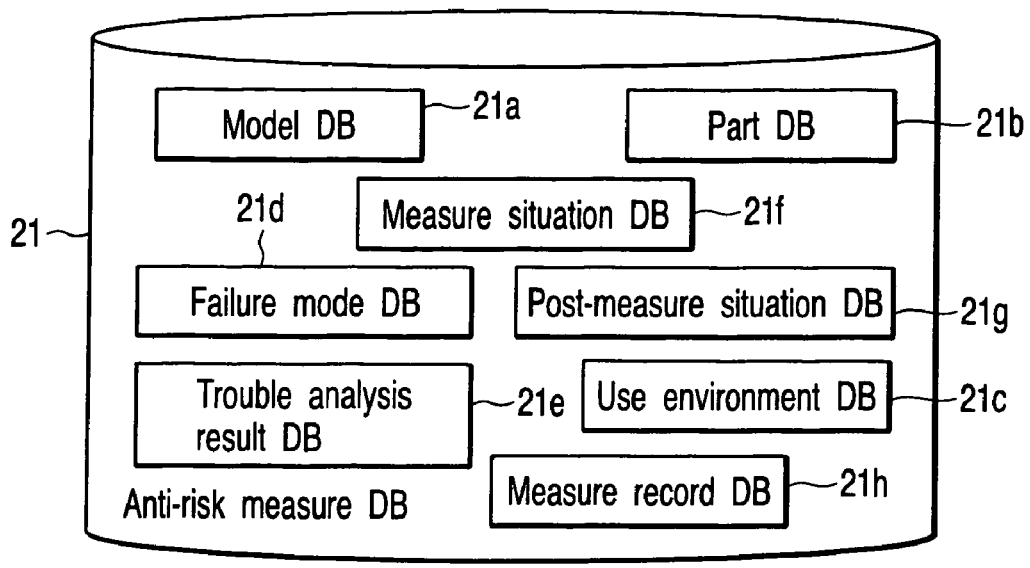
FIG. 3 is a block diagram showing an example of the structure of an anti-risk measure DB.

The anti-risk measure DB 21 may include either a single DB or a plurality of DBs. For example, as shown in FIG. 3, the anti-risk measure DB 21 may include DBs such as a model DB 21a, part DB 21b, use environment DB 21c, failure mode DB 21d, trouble analysis result DB 21e, measure method DB 21f, post-measure situation DB 21g, and measure record DB 21h. In this case, in the DBs, data of the product name, . . . , the necessary number of persons are stored in corresponding DBs, as shown in FIG. 4. The DBs are associated with each other through the product name and/or part name. Accordingly, the whole DBs build the anti-risk measure DB 21.

The risk assessment DB 22 stores the unit price of each part of the device related to the working record contained in the equipment maintenance information, the maintenance personnel data, labor cost unit price data, and equipment stop loss for each failure mode in association with the identification information of the device.

The risk assessment DB 22 also stores the failure mode related to the failure record contained in the equipment maintenance information DB, and the failure occurrence frequency for each failure mode in association with the identification information of the device. More specifically, the risk assessment DB 22 stores, e.g., product name, model name and type, user name, site name, delivery day, working day, target part name and type, failure occurrence day, failure reception day, recovery day, installation environment, failure mode, failure cause, failure sign phenomenon, MTBF, MTTF, maintenance method for each device and failure mode, time required for maintenance, necessary number of persons, labor cost unit price, equipment stop loss, quantities of repair parts and materials, unit prices of repair parts and materials.

Figure 5:
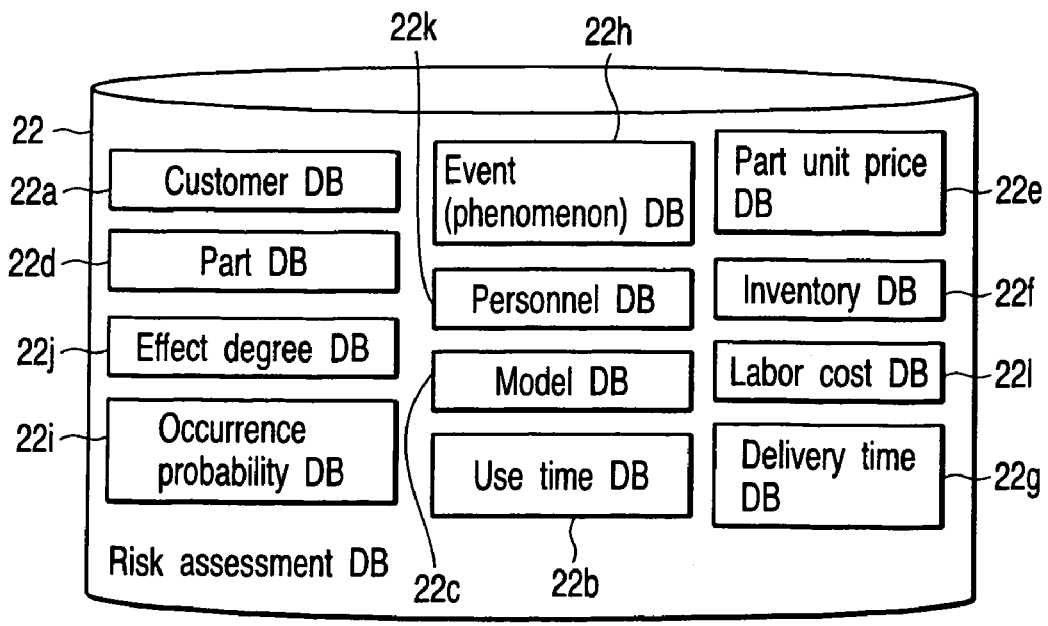
FIG. 5 is a block diagram showing an example of the structure of a risk assessment DB.

The risk assessment DB 22 may include either a single DB or a plurality of DBs. For example, as shown in FIG. 5, the risk assessment DB 22 may include DBs such as a customer DB 22a, use time DB 22b, model DB 22c, part DB 22d, part unit price DB 22e, inventory DB 22f, delivery time DB 22g, event DB 22h, occurrence probability DB 22i, effect degree DB 22j, personnel DB 22k, and labor cost DB 22l. In this case, as described above, the respective data are stored in corresponding DBs, as shown in FIG. 6. The whole DBs build the risk assessment DB 22.

Figure 7:
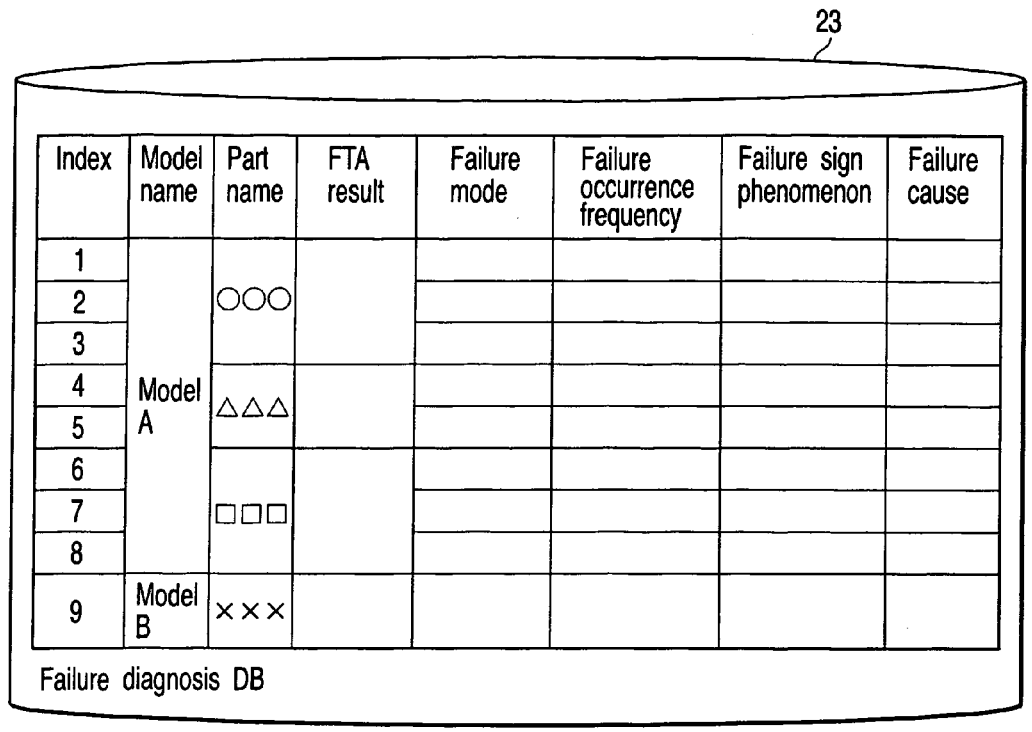
FIG. 7 is a view showing an example of the data structure of a failure diagnosis DB.

In the failure diagnosis DB 23, as shown in FIG. 7, at least one of the results of event tree analysis (ETA) and failure tree analysis (FTA) which are executed for each part of the device, and the failure occurrence frequency, failure sign phenomenon, and failure cause in the equipment maintenance information for each failure mode in the analysis result are stored in association with the identification information (model name) of the device and the identification information (part name) of each part of the device.

As shown in FIG. 7, index information may be added to each failure mode. The failure diagnosis DB 23 may store an analysis result by another method such as FMEA (Failure Mode Effect Analysis) instead of ETA and FTA.

The above-described diagnosis DB 20 may appropriately be subjected to data addition from another computer and/or data correction. For example, the inventory DB, delivery time DB, and personnel DB in the risk assessment DB 22 require even other pieces of information (e.g., the current inventory level, delivery time, and current personnel distribution) which are not contained in the equipment maintenance information. For this reason, data is added from another computer to the diagnosis DB 20, and/or data in it is corrected appropriately.

The diagnosis DB creation unit 30 executes data mining for the equipment maintenance information in the equipment maintenance information DB 10, executes reliability analysis, and creates the diagnosis DB 20. More specifically, the diagnosis DB creation unit 30 comprises a data mining function 31 and reliability analysis function 32.

Figure 8:
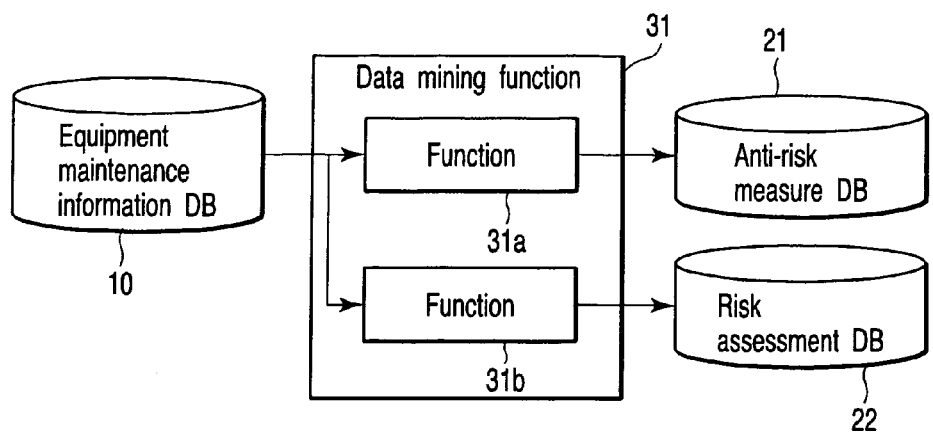
FIG. 8 is a block diagram showing an example of a data mining function.

As shown in FIG. 8, the data mining function 31 has a function 31a of sorting the equipment maintenance information in the equipment maintenance information DB 10, associating the pieces of information contained in the equipment maintenance information with each other, and creating the anti-risk measure DB 21, and function 31b of creating the risk assessment DB 22.

The reliability analysis function 32 executes reliability analysis for the equipment maintenance information in the DBs 21 and 22 created by the data mining function 31, on the basis of various kinds of reliability engineering theories such as FMEA, FTA, ETA, and failure probability statistics and creates the failure diagnosis DB 23.

Figure 9:
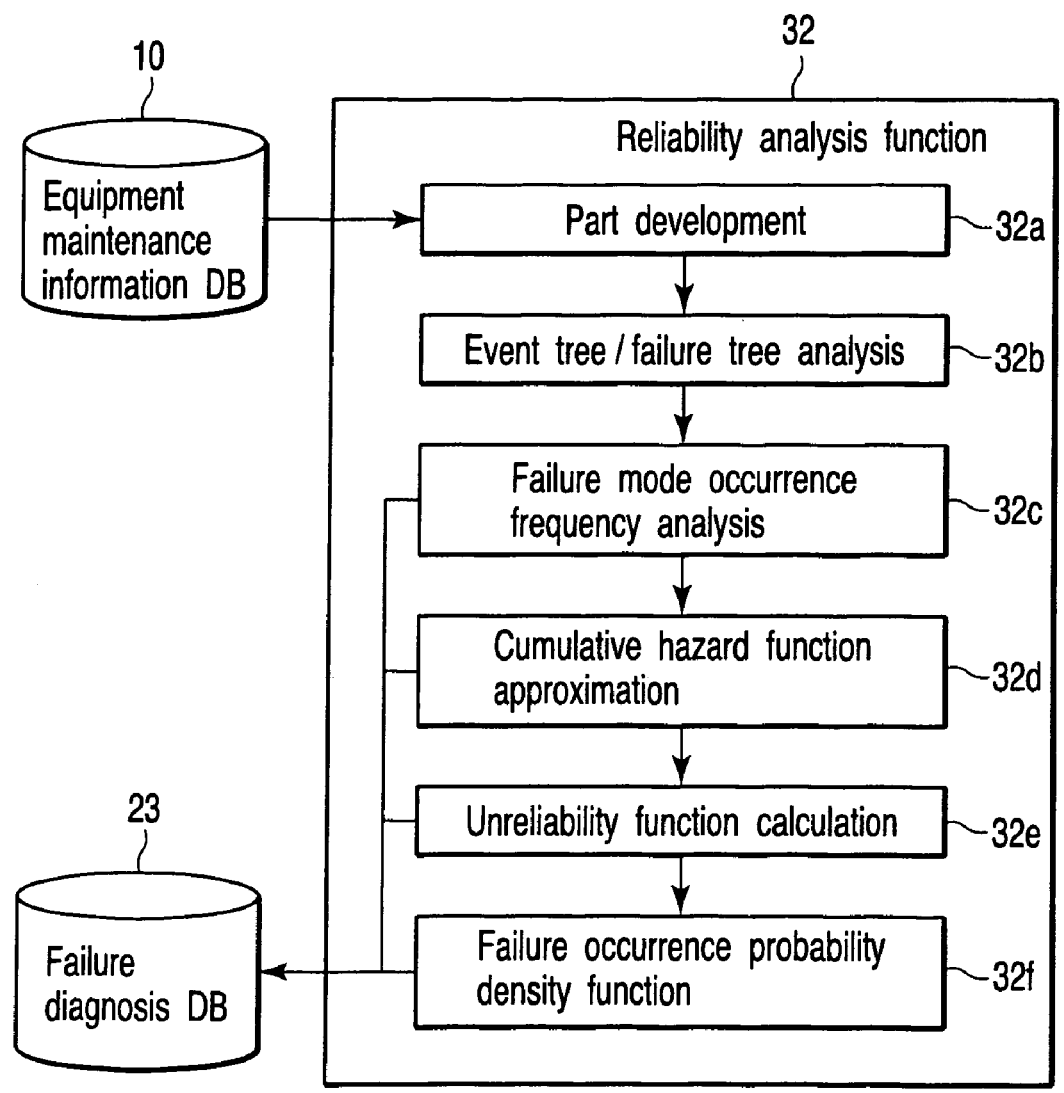
FIG. 9 is a block diagram showing an example of a reliability analysis function.

More specifically, the reliability analysis function 32 comprises a part development function 32a, event tree/ failure tree analysis function 32b, failure mode occurrence frequency analysis function 32c, cumulative hazard function approximation function 32d, unreliability function calculation function 32e, and failure occurrence probability density function 32f, as shown in FIG. 9.

Figure 10:
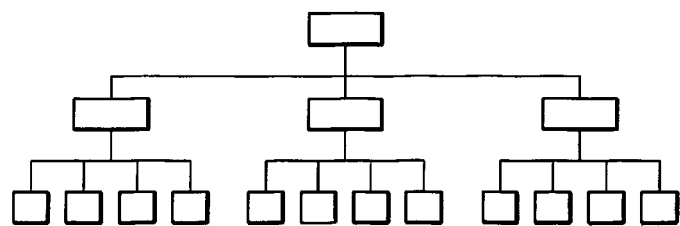
FIG. 10 is a schematic view showing an example of a part development result.
Figure 11:
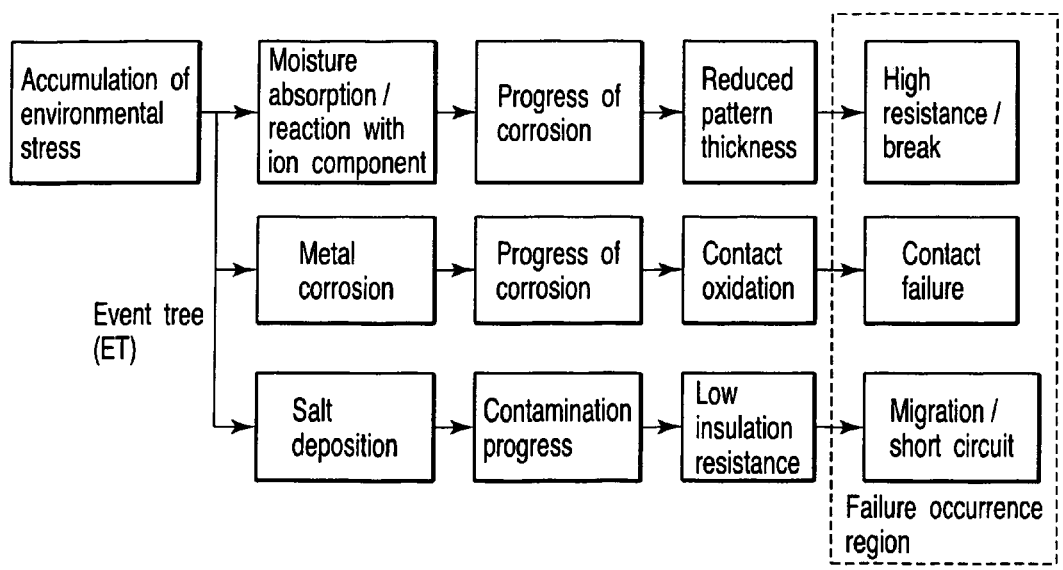
FIG. 11 is a schematic view showing an example of an event tree analysis result.
Figures 12, 13:
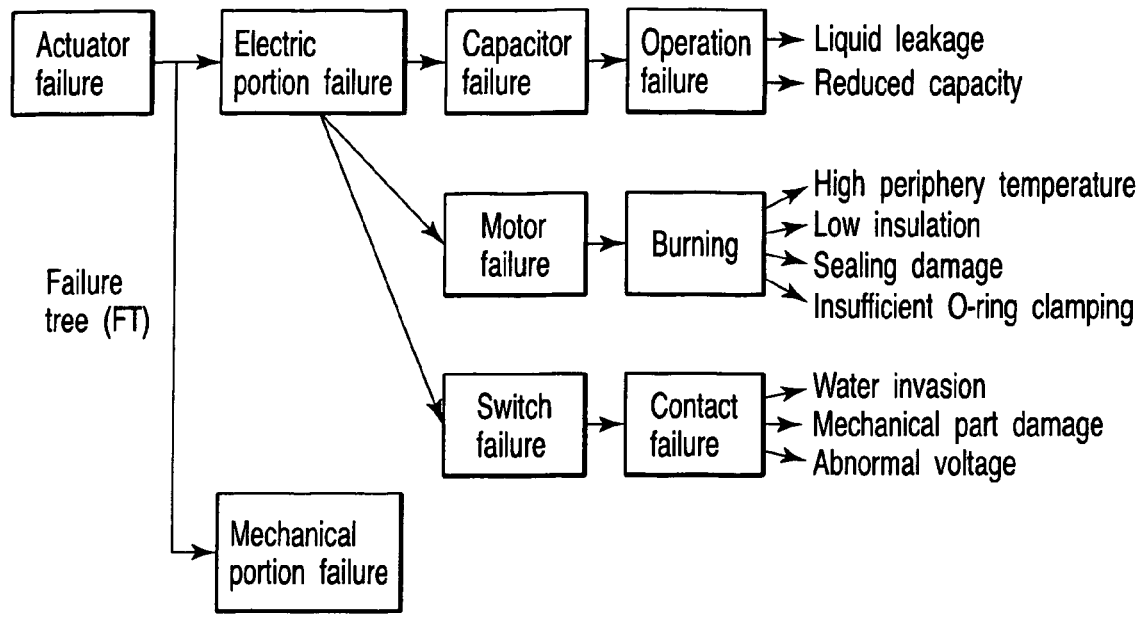
FIG. 12 is a schematic view showing the first example of a failure tree.
FIG. 13 is a view showing an example of a failure mode occurrence frequency analysis result.
Figure 14:
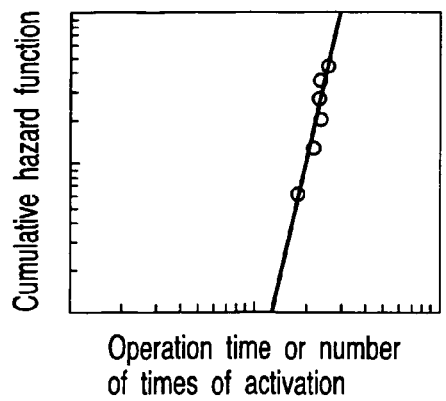
FIG. 14 is a graph showing an example of a cumulative hazard function approximation result.
Figure 15:
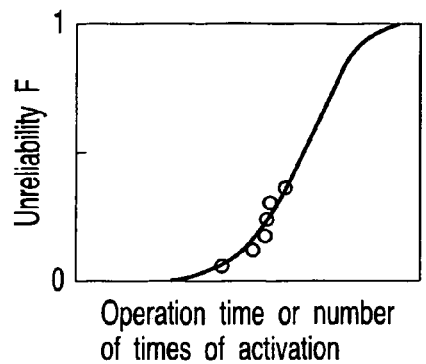
FIG. 15 is a graph showing an example of an unreliability function.
Figure 16:
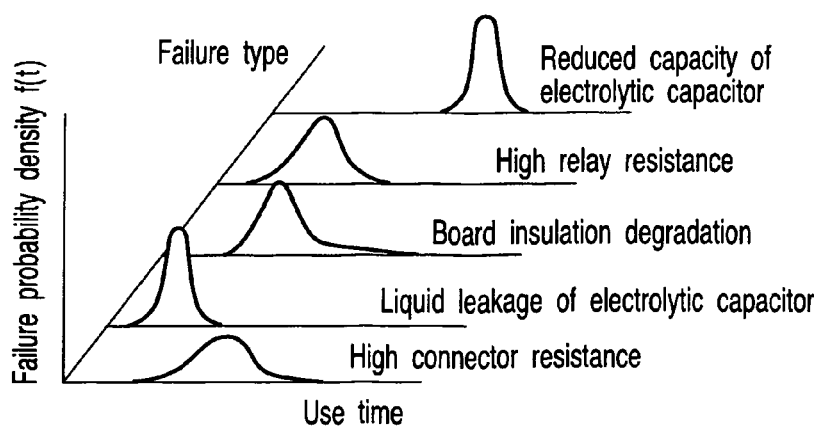
FIG. 16 is a graph showing an example of a failure probability density function.

FIG. 10 is a view showing an example of a part development result. FIG. 11 is a view showing an example of an event tree analysis result. FIG. 12 is a view showing an example of a failure tree. FIG. 13 is a view showing an example of a failure mode occurrence frequency analysis result. FIG. 14 is a graph showing an example of a cumulative hazard function approximation result. FIG. 15 is a graph showing an example of an unreliability function. FIG. 16 is a graph showing an example of a failure occurrence probability density function.

For example, the reliability analysis function 32 executes at least one of event tree analysis (ETA) and failure tree analysis (FTA) for each part on the basis of the part identification information and failure mode in the equipment maintenance information and obtains an analysis result.

For the analysis result and each failure mode in it, the reliability analysis function 32 associates, of the equipment maintenance information, the failure occurrence frequency, failure sign phenomenon, and failure cause with the identification information of the device and the identification information of each part, thereby creating the failure diagnosis DB 23.

The reliability analysis function 32 may execute analysis by another method such as FMEA (Failure Mode Effect Analysis) instead of ETA and FTA and store the analysis result in the failure diagnosis DB 23.

The diagnosis engine 40 comprises a risk assessment function 41, anti-risk measure selection function 42, risk correction function 43, numerical simulation function 44, failure analysis function 45, and financial calculation function 46, as shown in FIG. 1.

Figure 17:
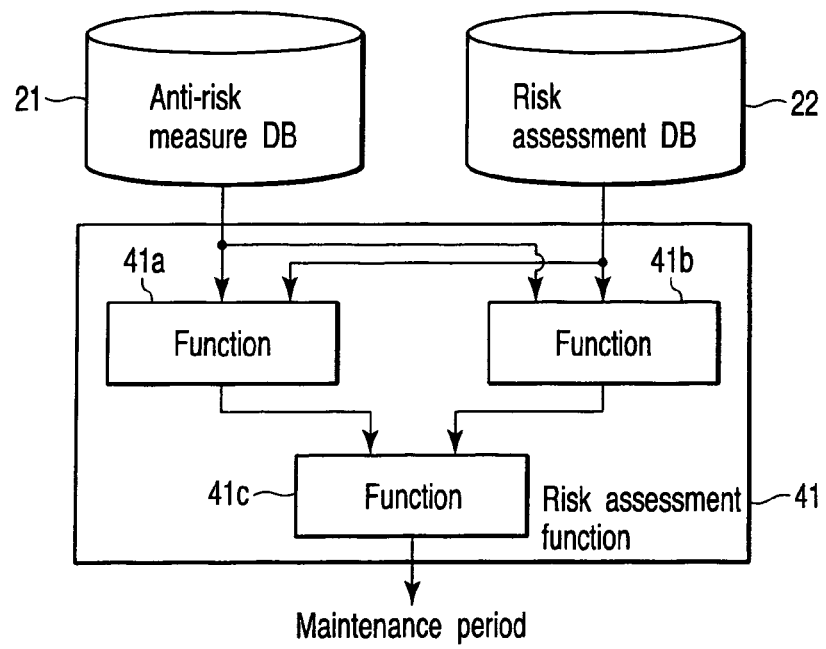
FIG. 17 is a view showing an example of a risk assessment function.

The risk assessment function 41 comprises functions 41a to 41c, as shown in FIG. 17.

Figure 18:
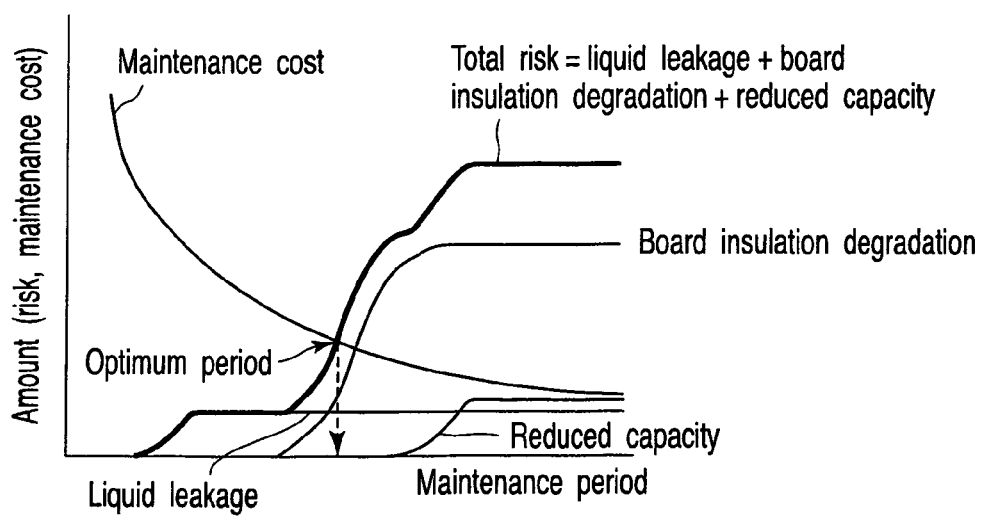
FIG. 18 is a graph showing an example of a total risk calculation result.

The function 41a refers to the anti-risk measure DB 21 and risk assessment DB 22 before occurrence of a failure in the device, and calculates the total risk (the total risk estimate amount and total maintenance cost) in case of a failure in each device along the time sequence on the basis of the failure occurrence frequency and equipment stop loss. FIG. 18 is a graph showing an example of a total risk calculation result.

The function 41b refers to the anti-risk measure DB 21 and risk assessment DB 22, and calculates the maintenance cost along the time sequence in executing the measure method for each device in advance on the basis of the failure occurrence frequency, measure method, unit price of each part of the device, personnel data, and labor cost unit price data.

The function 41c adds the total risk and maintenance cost along the time sequence and outputs a time when the obtained sum is minimized as a maintenance period.

The intersection between the curve of the total risk and that of the maintenance cost may be output as the maintenance period.

When the maintenance period is output, the analyzer can grasp, e.g., the cash quantity which should be held against an event such as error occurrence.

Figure 19:
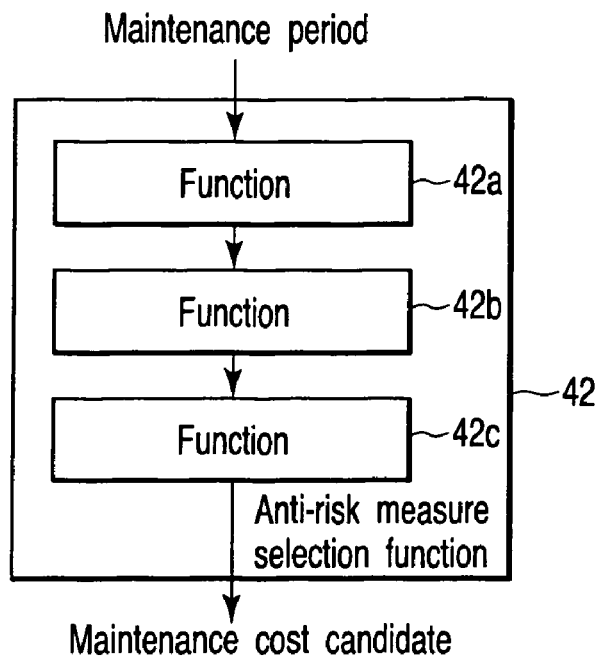
FIG. 19 is a block diagram showing an example of an anti-risk measure selection function.

The anti-risk measure selection function 42 comprises functions 42a to 42c, as shown in FIG. 19.

The function 42a calculates, for each part of the device, the maintenance cost at the maintenance period output by the risk assessment function 41.

The function 42b sums the maintenance costs of the parts calculated by the function 42a in a plurality of combinations and calculates a plurality of maintenance cost candidates.

The function 42c selects and outputs one of the maintenance cost candidates. To select the maintenance cost candidate, for example, a method of selecting the maintenance cost candidate corresponding to the maximum amount within the maintenance budget at the maintenance period from the maintenance cost candidates can be used.

Figure 20:
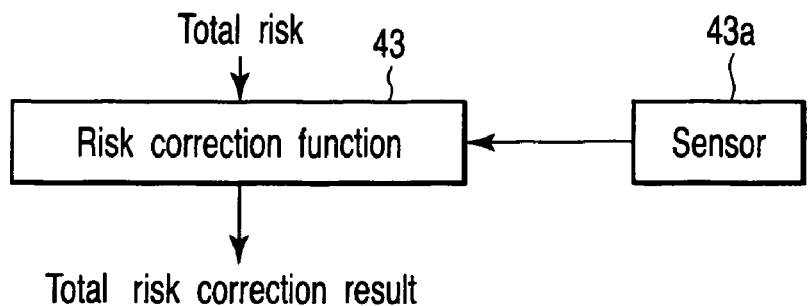
FIG. 20 is a block diagram showing an example of a risk correction function.

The risk correction function 43 corrects the total risk on the basis of the output from a sensor 43a which detects the state of the device, and outputs the total risk correction result, as shown in FIG. 20.

Figure 21:
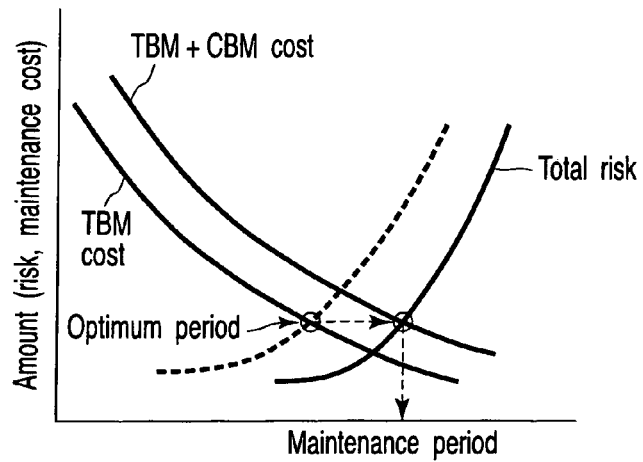
FIG. 21 is a graph showing an example of a total risk correction result.

FIG. 21 is a graph showing an example of the total risk correction result. In the example shown in FIG. 21, since the state of the device is good, the total risk is corrected to the right side. However, the present invention is not limited to the example shown in FIG. 21. The total risk may be corrected to the left side because the state of the device is bad. In place of the sensor 43a, a diagnosis system which monitors the state of the device or system may be used.

Figure 22:
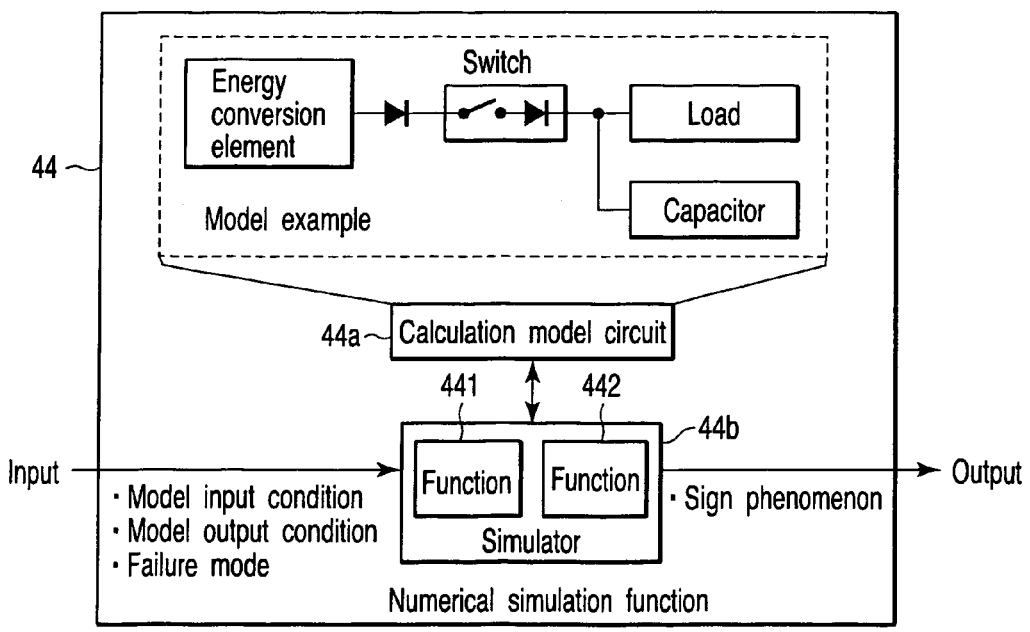
FIG. 22 is a block diagram showing an example of a numerical simulation function.

The numerical simulation function 44 comprises a calculation model circuit 44a and simulator 44b, as shown in FIG. 22.

The calculation model circuit 44a has a simulation function of simulating the behavior for at least one of the device and the parts of the device.

The simulator 44b comprises a function 441 of activating the calculation model circuit 44a on the basis of the failure mode and at least one of the designated device and the designated parts of the device, and estimating the failure sign phenomenon of the failure mode, and a function 442 of writing the estimated failure sign phenomenon in the failure diagnosis DB 23.

Upon receiving the product name, part name, and failure name, the failure analysis function 45 collates them with input information in the diagnosis DB 20, searches for and outputs the failure cause and failure sign phenomenon on the basis of the past record.

Figure 23:
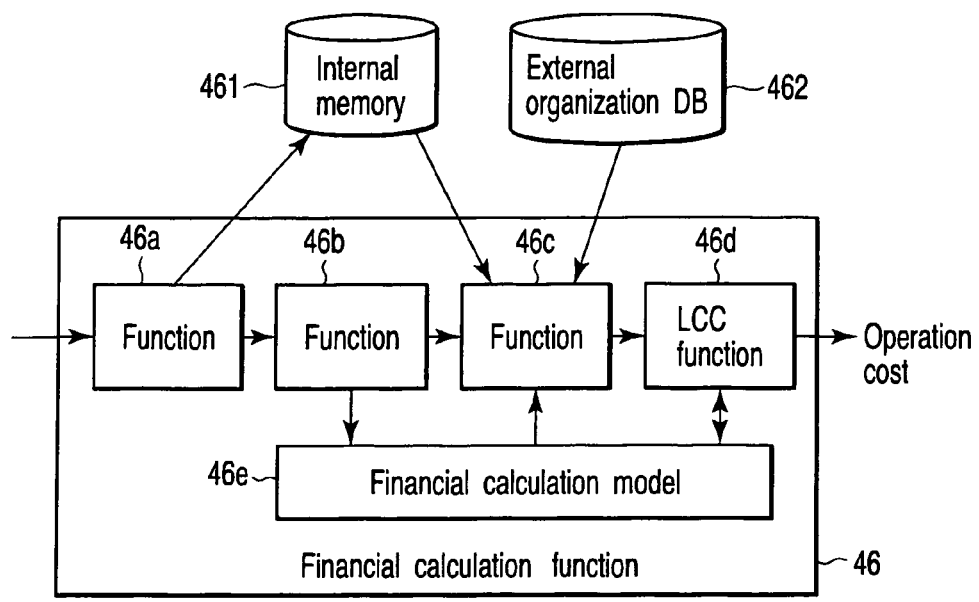
FIG. 23 is a block diagram showing an example of a financial calculation function.

The financial calculation function 46 comprises functions 46a to 46c, LCC (Life Cycle Cost) function 46d, and financial calculation model 46e, as shown in FIG. 23.

The function 46a writes, in an internal memory 461, the total risk and maintenance cost calculated by the risk assessment function 41.

The function 46b activates the financial calculation model 46e which uses at least one of the NPV (Net Present Value) method and IRR (Internal Rate of Return) method.

The function 46c refers to the internal memory 461 and an external organization DB 462 in which the discount rate is stored in advance, on the basis of the financial calculation model 46e.

The LCC function 46d sets, in the financial calculation model 46e, the total risk, maintenance cost, and discount rate obtained by referring to the internal memory 461 and external organization DB 462, calculates the operation cost throughout the life cycle of the device, and outputs the obtained operation cost.

The operation of the maintenance support apparatus 1 having the above-described arrangement will be described next.

(Database Creation)

The diagnosis DB creation unit 30 extracts desired data items necessary for data processing in the diagnosis engine 40 and sorts and corrects them into a desired data format.

More specifically, the diagnosis DB creation unit 30 causes the data mining function 31 to extract, from the equipment maintenance information DB 10, the model name and type of the device to be subjected to maintenance support, names and types of parts of the device, working days of the device and parts, failure occurrence day, failure reception day, recovery day, user name, site name, device installation environment conditions, failure modes, occurrence frequency of each failure mode, failure cause, failure sign phenomenon, MTBF, MTTF, maintenance method for each device and failure mode, time required for maintenance, necessary number of persons, labor cost unit price, customer-side equipment stop loss, and quantities and unit prices of repair parts and materials. Then, the diagnosis DB creation unit 30 creates the risk assessment DB 22 and anti-risk measure DB 21 as shown in FIGS. 3 to 6.

To create a database, for example, a method of defining major key items and editing each item as shown in FIGS. 4 and 6 can be used. For the operational convenience, all the DBs 21 to 23 are preferably created as relational databases which are easy to add and/or correct data.

Next, the diagnosis DB creation unit 30 causes the reliability analysis function 32 to create the failure diagnosis DB 23 on the basis of the DBs 21 and 22, as shown in FIG. 7. More specifically, the reliability analysis function 32 creates database information in accordance with the procedures shown in FIG. 9.

First, the reliability analysis function 32 develops the target model or product into parts, as shown in FIG. 10. Accordingly, the constituent elements of the device become clear.

The reliability analysis function 32 analyzes, of the developed parts, the major parts in association with the failure mode, occurrence order of the failure mode, and event causality relation. Accordingly, the reliability analysis function 32 creates at least one of the event tree (ET) as shown in FIG. 11 and the failure tree (FT) as shown in FIG. 12.

Of the methods of managing the risk by investigating the failure cause, the event tree is suitable for cause analysis, and the failure tree is suitable for progress analysis.

The reliability analysis function 32 analyses the failure mode from the data in the DBs 21 and 22. More specifically, as shown in FIG. 13, the failure record extracted from the anti-risk measure DB 21 or risk assessment DB 22 for each part is classified on the basis of the failure mode, and the occurrence frequency for each failure mode is calculated.

On the basis of at least one of the results of the event tree analysis and failure tree analysis and each failure mode in the analysis result, the reliability analysis function 32 associates the failure occurrence frequency, failure sign phenomenon, and failure cause of the equipment maintenance information with the identification information of the device and that of each part of the device, thereby creating the failure diagnosis DB 23.

Subsequently, the reliability analysis function 32 rearranges the obtained failure occurrence frequencies along the time sequence and creates a cumulative hazard function as shown in FIG. 14 on the basis of the data. The cumulative hazard function H(t) is a value obtained by accumulating a failure rate $\lambda(t)$ along the time sequence between [0, t] and given by $$H(t) = \int_0^t \lambda(x) dx \tag{1}$$

where t is the operation time obtained from the interval between the working start day and the failure occurrence day. Let $N_i$ be the remaining count immediately before a failure time $t_i$. If $N_i$ is sufficiently large, the cumulative hazard function H(t) may approximately be obtained by $$H(t) = \sum \frac{1}{N_i} \tag{2}$$

The cumulative hazard function H(t) and an unreliability F(t) hold a relationship given by $$F(t) = 1 - \exp\{-H(t)\} \tag{3}$$

The reliability analysis function 32 estimates the unreliability F(t) as shown in FIG. 15, calculates a reliability function R(t)=1−F(t) from the estimate result, calculates a failure occurrence probability density function f(t) as shown in FIG. 16, and writes F(t), R(t), and f(t) in the failure diagnosis DB 23.

For each node of at least one of the event tree analysis result and failure tree analysis result, the reliability analysis function 32 calculates the failure repair cost and equipment stop loss in case of the event or failure and writes the calculation results in the risk assessment DB 22. The failure repair cost is calculated by, e.g., repair part material unit price×repair part material quantity+labor cost unit price× necessary number of persons×required time. The equipment stop loss is calculated by equipment stop loss per unit time×required time.

The reliability analysis function 32 may extract index data for the anti-failure measure or quality improvement by calculating and statistically analyzing the distribution of the recovery time, maintenance reception lead time, failure time, or repair time of each device or system from the equipment maintenance information in the equipment maintenance information DB 10. Index data of this kind can be extracted when the reliability analysis function 32 is programmed in advance in accordance with desired data contents.

With the above-described operation, creation of the diagnosis DB 20 is ended.

(Risk Assessment)

The diagnosis engine 40 refers to the diagnosis DB 20 created by the above-described operation and executes various kinds of calculation and determination.

Risk assessment by the risk assessment function 41 will be described first.

Figure 24:
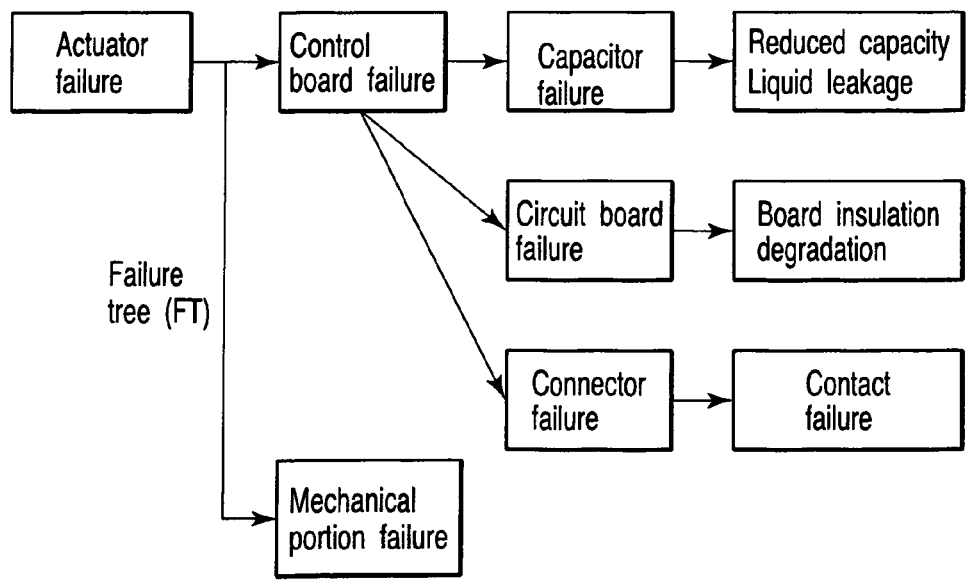
FIG. 24 is a schematic view showing the second example of the failure tree.

The diagnosis engine 40 causes the risk assessment function 41 to calculate the risk estimate amount at the time t for the individual events described in the nodes of the failure tree as shown in FIG. 24.

Each risk estimate amount is obtained by multiplying "failure repair cost or cost by equipment stop" by "unreliability F(t)". The risk assessment function 41 sums the individual risk estimate amounts for each event tree or failure tree to obtain a total risk as a total risk estimate amount of each device or system.

In the graph shown in FIG. 18, the abscissa represents the maintenance period (time interval), and the ordinate represents the amount. The total risk increases in proportion to the maintenance period because the unreliability F used for calculation increases with time.

On the other hand, the maintenance cost decreases in proportion to the maintenance period because the cost increases as the number of times of maintenance period increases.

The risk assessment function 41 adds the rising curve of the total risk and the dropping curve of the maintenance cost to obtain the total maintenance cost. The risk assessment function 41 then sets the maintenance period such that the total maintenance cost is minimized.

The risk assessment function 41 may set the maintenance period to an arbitrary time (e.g., a time k days after the maintenance cost minimizing period) in a period when the total risk exceeds the maintenance cost.

As described above, the risk assessment function 41 can quantitatively determine the optimum check period or renewal time and set the maintenance period.

(Selection of Anti-Risk Measure)

Next, the diagnosis engine 40 causes the anti-risk measure selection function 42 to select an anti-risk measure on the basis of the result obtained by the risk assessment function 41. An anti-risk measure is selected by considering the magnitude of the risk of each node of the layers of failure tree analysis and the maintenance budget of the user and combining nodes which exhibit the maximum effect within the budget.

More specifically, the anti-risk measure selection function 42 calculates, for each part of the device, the maintenance cost at the maintenance period output by the risk assessment function 41, sums the maintenance costs of the parts in a plurality of combinations, and calculates a plurality of maintenance cost candidates.

The anti-risk measure selection function 42 selects and outputs one of the maintenance cost candidates. To select the maintenance cost candidate, for example, a maintenance cost candidate corresponding to the maximum amount within the maintenance budget at the maintenance period is selected from the maintenance cost candidates.

For example, assume that the risks of a failure tree analysis hierarchical structure include nodes of 3, 5, 9, 6, and 7, and the maintenance budget is 11. In this case, four combinations {3, 5}, {3, 6}, {9}, and {5, 6} are obtained as combinations of anti-risk measures executable within the budget. The combination which can explicit the budget at maximum is {5, 6}. In this case, the anti-risk measure selection function 42 reads out the anti-risk measures {5, 6} from the anti-risk measure DB 21 and outputs them.

When the maintenance budget is 16 in the same failure tree analysis hierarchical structure, two combinations {7, 9} and {5, 6, 7} can explicit the budget at maximum.

In this case, the measure may be determined by, e.g., reflecting priority set by the analyzer for each node.

The anti-risk measure selection function 42 also rationalizes the part exchange period and routine check period. In this case, by using the failure occurrence probability density function f(t) for each failure mode calculated by the reliability analysis function 32, the anti-risk measure selection function 42 determines the device use time before the failure occurrence probability density function f(t) exceeds a predetermined level and outputs a recommended part exchange period.

For a device such as an elevator which is maintained by TBM (Time Based Maintenance), the anti-risk measure selection function 42 outputs, as a maintenance period, a period which can minimize the total risk calculated by the risk assessment function 41.

(Risk Correction)

As shown in FIG. 21, the risk correction function 43 introduces CBM (Condition Based Maintenance). More specifically, in addition to normal TBM, the risk correction function 43 monitors the criterion for degradation of a device or part by using the sensor 43a, determines the state of the device or part, and confirms whether a failure probability based on the record in the field has exhibited a time shift.

For example, assume that a partial discharge charge quantity Q of a switchgear is set as a criterion for a failure, a switchgear whose maximum value $Q_{max}$ of Q exceeds 100 [pC] is defined as a defective part, and the failure probability is obtained from the time dependence of the number of times of failure occurrence.

In the failure probability statistic, normally, the partial discharge charge quantity Q of each switchgear gradually increases immediately before a predetermined period when the failure probability increases. However, if degradation progresses slowly, the charge quantity Q does not increase at all even after the predetermined period. If degradation progresses quickly, the charge quantity Q increases to almost 100 [pC] before the predetermined period.

The risk correction function 43 corrects the risk when degradation progresses slowly or quickly, as described above. Examples of the factor which varies the progress of degradation are a characteristic variation between parts and a variation in device installation environment.

The risk correction function 43 measures the state of a device or part at a desired timing by using a diagnosis tool such as an insulation degradation diagnosis system for condition based maintenance and corrects the risk by correcting the failure occurrence probability density function.

The risk correction function 43 can correct the risk by using a CBM tool corresponding to a device or part, such as a bearing sound diagnosis system for an HDD or a dielectric loss tans measurement system for a board or capacitor in addition to the insulation degradation diagnosis system.

(Numerical Simulation)

In the numerical simulation function 44, the model reference simulator 44b selects the calculation model circuit 44a for each device or part by the operation of the analyzer, as shown in FIG. 22.

In addition, on the basis of the input and output conditions of the circuitry model and designated failure mode for a designated device or part, the simulator 44b reads out the failure cause of the failure mode from the failure diagnosis DB 23 to the selected calculation model circuit 44a.

On the basis of the obtained failure cause, the simulator 44b activates the calculation model circuit 44a and estimates the failure sign phenomenon of the failure cause.

For, e.g., a device which selectively supplies, to a load, electric energy obtained from an energy conversion element such as a solar cell or a power from a capacitor, the numerical simulation function 44 simulates the time series input to the energy conversion element and the time series load output corresponding to the input, and simultaneously the switching operation for circuit balance, estimates the charge/discharge characteristic of the capacitor, estimates the behaviors of the capacitor and energy conversion element before the failure, and estimates the failure sign phenomenon.

The estimated failure sign phenomenon is written in the failure diagnosis DB 23.

According to the numerical simulation function 44, a failure mode having no record in the field and failure analysis and error determination for a new product can be implemented. Hence, the risk can be reduced.

(Failure Analysis)

When a product name, part name, and failure mode are input by the operation of the analyzer, the failure analysis function 45 collates them with the input information in the diagnosis DB 20, searches the failure diagnosis DB 23 for the failure cause and failure sign phenomenon on the basis of the past operation record, and outputs them. For a new failure event without any past record, a failure analysis result or trouble analysis result is registered in the diagnosis DB 20 to update it, thereby increasing the hit ratio of failure cause search.

(Financial Calculation)

The financial calculation function 46 writes the total risk and maintenance cost obtained by the risk assessment function 41 in the internal memory 461 and activates the financial calculation model 46e using the NPV method or IRR method.

In the NPV method, the total cash flow from the current time to the future is replaced with the present value so that the present value of the total expense (cash outflow) can directly be compared with that of the revenue (cash inflow).

More specifically, "revenue" and "expense" of funds are wholly replaced with "present values", and the sum of them is calculated. Then, the positive and negative values cancel each other. The remaining amount indicates the amount of return based on the present value. NPV indicates this amount of return.

That is, NPV=[present value of cash inflow]+[present value of cash outflow]. The general expression of NPV is given by $$NPV = C_0 + \frac{C_1}{(1+R_1)} + \frac{C_2}{(1+R_2)^2} + \cdots + \frac{C_n}{(1+R_n)^n} \qquad (4)$$
$$= \sum_{i=0}^{n} \frac{C_i}{(1+R_i)^i}$$

$C_i$: cash flow in i period $R_i$: discount rate applied to assessment in i period The discount rate $R_i$ is read out from the external organization DB 462 such as the government or an insurance company. The discount rate $R_i$ is preferably set to a realistic value.

According to the financial calculation model 46e using the NPV method, when the total cost ($C_i$) is calculated by adding the maintenance cost and total risk throughout the life cycle, and the total risk is wholly replaced with the present value, the maintenance cost and anti-risk measure can be planned such that the present value is maximized.

On the other hand, when IRR is used for financial calculation, $$\text{Initial investment capital} = \sum_{i=1}^{n} \frac{C_i}{(1+R_i)^i} \qquad (5)$$

$C_i$: cash flow in i period

R: IRR

An internal rate of return R (corresponding to the discount rate) used in the IRR method is a "predetermined rate of interest". The discount rate $R_i$ in the NPV method is a "reference rate of interest" corresponding to a period and changes for each period.

Hence, in the IRR method, since the rate of interest for reinvestment (rate of return) is handled as one value, the cash flow to be assessed does not correspond to the change in prevailing rate for reinvestment or reborrowing. For this reason, the method to be used, i.e., the IRR method or NPV method is determined in accordance with the priority set by the analyzer.

The financial calculation function 46 refers to the internal memory 461 and external organization DB 462 on the basis of the selected financial calculation model 46e.

The financial calculation function 46 sets, in the financial calculation model 46e, the total risk in the internal memory 461, the maintenance cost, and the discount rate in the external organization DB 462 and calculates the operation cost throughout the life cycle of the device.

As described above, in this embodiment, the diagnosis DB 20 is created on the basis of data mining of the device maintenance information (field life data) and reliability analysis. For this reason, risk assessment can be done on the basis of the reliability theory, and optimization of check, maintenance, and renewal of an electric device can be supported.

In this embedment, the diagnosis engine 40 refers to the risk assessment DB 22 and anti-risk measure DB 21. The diagnosis engine 40 calculates along the time sequence the total risk (risk estimate amount) in case of a failure for each device and the maintenance cost when the measure is to be executed for each device and adds the total risk and maintenance cost along the time sequence. Accordingly, the optimum maintenance period of each device can be calculated.

When a failure has occurred in a device, the diagnosis engine 40 can analyze a failure except a secular change on the basis of the operation record by referring to the failure diagnosis DB 23 on the basis of the failure mode and identification information such as the product name and part name of the device. Accordingly, the maintenance method for each part or device can be customized.

In this embodiment, the arrangement of the maintenance support apparatus 1 is designed for general purpose use. Additionally, in this embodiment, the registration method to equipment maintenance information is designed for general purpose use. For this reason, when sufficient field record data is acquired, risk assessment and failure diagnosis for devices or systems in a very wide range can be implemented. The designer of a device can increase the reliability of the product by referring to the results of risk assessment and failure diagnosis.

In this embodiment, the diagnosis DB 20 is a relational database. For this reason, correction, addition, and management of data can easily be executed, and the reliability of equipment maintenance information can be maintained.

When the reliability analysis function 32 calculates the recovery time, maintenance reception lead time, failure time, repair time, and the like of a device or system on the basis of the risk assessment DB 22 and anti-risk measure DB 21, major factors in the recovery time in case of a failure or trouble can be searched for. Hence, improving factors for more quick measure taking can be extracted.

Figure 25:
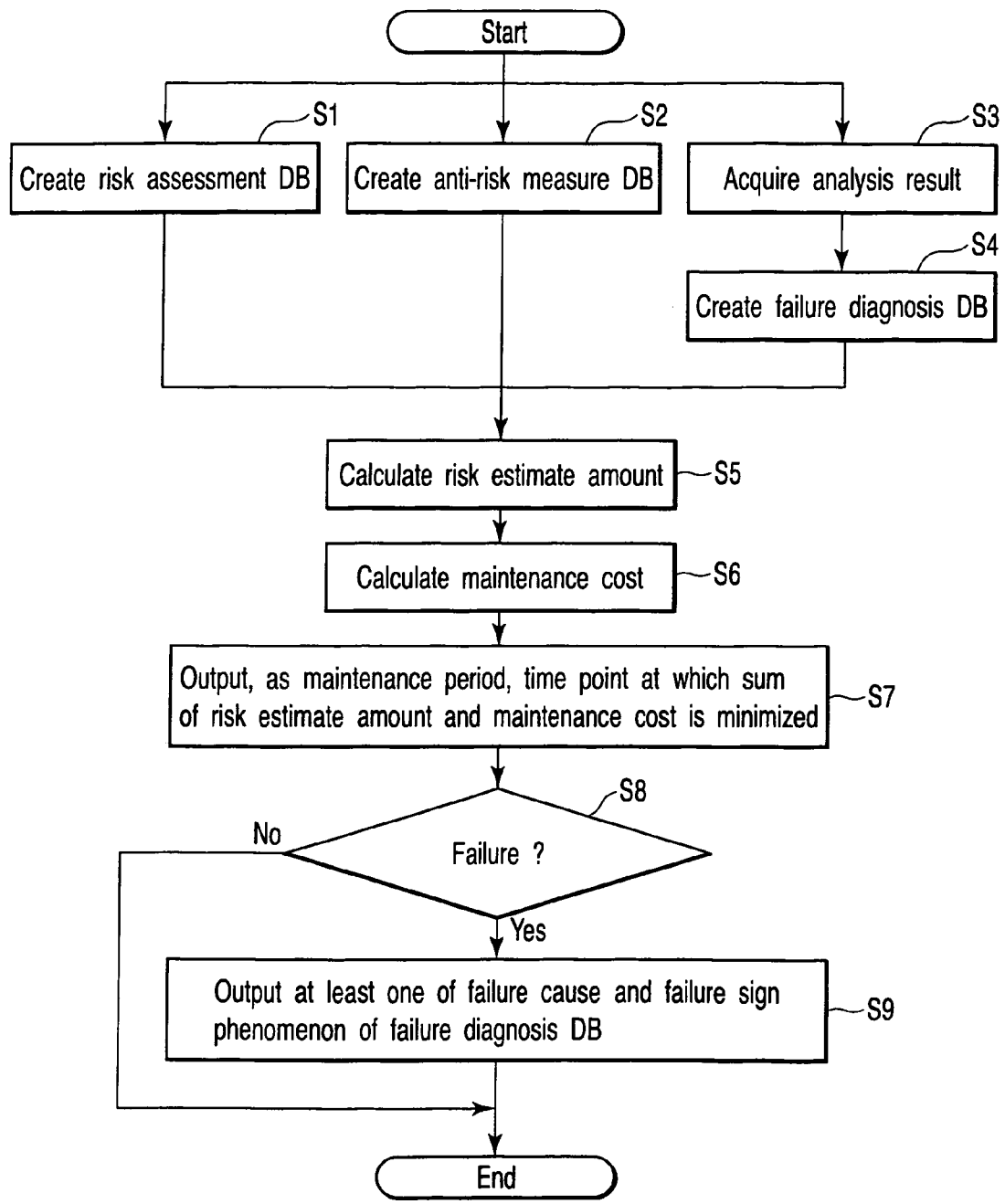
FIG. 25 is a flowchart showing an example of processing of the maintenance support apparatus according to the first embodiment.

FIG. 25 is a flowchart showing an example of processing of the maintenance support apparatus 1 according to the first embodiment.

In step S1, the diagnosis DB creation unit 30 of the maintenance support apparatus 1 creates the risk assessment DB 22.

In step S2, the diagnosis DB creation unit 30 creates the anti-risk measure DB 21.

In step S3, the diagnosis DB creation unit 30 executes at least one of event tree analysis and failure tree analysis to acquire an analysis result.

In step S3, the diagnosis DB creation unit 30 creates the failure diagnosis DB 23 on the basis of the analysis result.

The processing order of steps S1 to S4 can freely be changed as long as step S3 is executed before step S4. Step S1, step S2, and steps S3 and S4 may be executed in parallel.

In step S5, the diagnosis engine 40 of the maintenance support apparatus 1 calculates, along the time sequence, the risk estimate amount in case of a failure in a part.

In step S6, the diagnosis engine 40 calculates, along the time sequence, the maintenance cost in executing a measure for the part in advance.

In step S7, the diagnosis engine 40 adds the risk estimate amount and maintenance cost along the time sequence and outputs, as a maintenance period, the time when the sum is minimized, or the intersection between the risk estimate amount and the maintenance cost.

In step S8, the diagnosis engine 40 determines whether a failure has occurred in the part. If NO in step S8, the processing is ended.

In step S9, when a failure has occurred in the part, the diagnosis engine 40 refers to the failure diagnosis DB 23 and outputs at least one of the failure cause and failure sign phenomenon.

In this embodiment, with the diagnosis engine 40, various kinds of effects to be described below can be obtained in addition to the above-described optimum maintenance period calculation.

For example, the anti-risk measure selection function 42 calculates a plurality of maintenance cost candidates at the maintenance period and selectively outputs one of the maintenance cost candidates. Accordingly, the anti-risk measure which can exhibit the maximum effect in the maintenance budget of the user can be selected.

In this embodiment, the risk correction function 43 corrects online the risk calculated from equipment maintenance information in accordance with the output from the sensor 43a or diagnosis system which monitors the state of the target device or system. Accordingly, a case in which the time series change of the risk is perturbed with respect to the periodical load situation of the target device can be calculated. Since the maintenance timing or risk reducing method can be selected in consideration of the perturbation, the reliability of the device or system can be increased.

In this embodiment, the numerical simulation function 44 estimates a failure sign phenomenon for a failure event which can be modeled to the calculation model circuit 44a. Accordingly, when a failure sign phenomenon which has never occurred in the maintenance target device is monitored by a sensor or the like, occurrence of a trouble or error can be prevented.

When one of the model name, part name, and failure name is input to the diagnosis engine 40, the occurrence probability, cause, sign phenomenon and the like of a desired failure phenomenon can quickly be estimated by using the failure analysis function 45 according to this embodiment.

When the financial calculation model 46e and LCC function 46d of the financial calculation function 46 according to this embodiment are used, not only the life of a device but also the long-term life cycle cost throughout the plant life cycle can be assessed. Hence, the cost effectiveness can quantitatively be presented.

(Second Embodiment)

In this embodiment, a reliability analysis program which implements the reliability analysis function 32 according to the first embodiment will be described.

The reliability analysis program according to this embodiment analyzes the reliability of a device on the basis of equipment maintenance information containing device failure information, exchange information, and renewal information fed back from the device operation site and device shipment information containing device design information.

In this embodiment, the reliability analysis program can execute reliability analysis for various units such as a device, product, product model, part, part model, equipment, system, apparatus, product type, part type, and plant.

For example, the reliability analysis program according to this embodiment extracts data for a combination of desired items such as a product model, part model, and type as examples of device identification information and an industrial category and customer name as examples of device customer identification information. Then, the reliability analysis program calculates the failure occurrence probability density function and unreliability function for the data extraction result.

Figure 26:
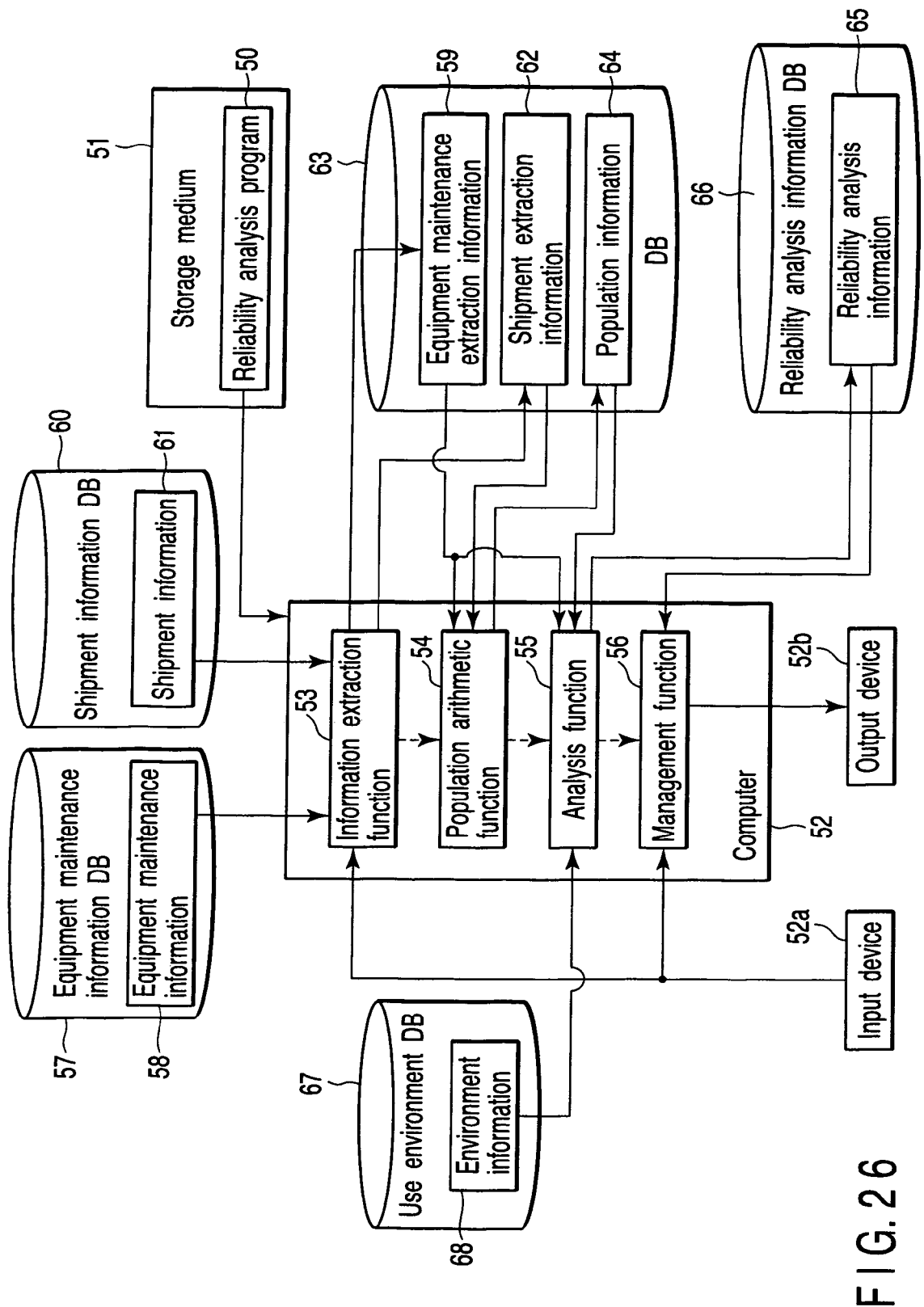
FIG. 26 is a block diagram showing an example of a reliability analysis program according to the second embodiment of the present invention.

FIG. 26 is a block diagram showing an example of the reliability analysis program according to this embodiment. In this embodiment, reliability analysis executed for each of parts included in a product will mainly be described. This also applies to reliability analysis executed for another device unit (e.g., system, apparatus, product type, or part type).

A reliability analysis program 50 is recorded on a recording medium 51. The reliability analysis program 50 is loaded to a computer 52 of a diagnosis DB creation unit 30 and executed to implement an information extraction function 53, population arithmetic function 54, analysis function 55, and management function 56.

The information extraction function 53 extracts the data of items necessary for reliability analysis, which are designated by an input device 52a, from equipment maintenance information 58 managed by an equipment maintenance information DB 57 and creates equipment maintenance extraction information 59. For example, the information extraction function 53 executes search and filtering for the equipment maintenance information 58 in accordance with a combination of desired items such as an industrial category, customer name, system name, equipment name, model name, failure portion, failure mode, failure occurrence day, delivery day, failure occurrence time, failure cause, part name, type, and defective board name to extract only necessary information and creates the equipment maintenance extraction information 59.

FIG. 27 is a view showing an example of the equipment maintenance extraction information 59.

Referring to FIG. 27, the equipment maintenance extraction information 59 containing information related to items "industrial category", "customer name", "system name", "equipment name", "failure portion", "failure mode", "failure occurrence day", "delivery day", "failure occurrence time", "failure cause superordinate classification", "part name", and "type" is created on the basis of the equipment maintenance information 58.

For example, the value of "failure occurrence time" in the equipment maintenance extraction information 59 is obtained by (failure occurrence day−delivery day)×24 [hrs].

The information extraction function 53 extracts the data of items necessary for reliability analysis, which are designated by the input device 52a, from shipment information 61 managed by a shipment information DB 60 and creates shipment extraction information 62.

FIG. 28 is a view showing an example of the shipment extraction information 62.

The shipment extraction information 62 contains information related to items "product name", "device type", "part name", "part type", "shipment date/time (delivery date/time)", "number of shipped units", and "customer name (deliver destination or shipment destination)".

In this embodiment, the equipment maintenance extraction information 59 and shipment extraction information 62 are managed by using a DB 63. The equipment maintenance extraction information 59 and shipment extraction information 62 are managed by using a unified format and shared by different departments. Accordingly, data management, data analysis, and interpretation of the equipment maintenance extraction information 59 and shipment extraction information 62 can be centralized.

To create the equipment maintenance extraction information 59 from the equipment maintenance information 58 or the shipment extraction information 62 from the shipment information 61, individual pieces of information are preferably selected by using a pull-down menu to maintain their reliability. Manual input by the analyzer is not preferable.

The DB 63 may be an exhaustive database including all items as shown in FIG. 27 or 28. For the operational convenience, the DB 63 may be formed as a relational database which is easy to add and correct information.

The population arithmetic function 54 obtains the number of shipped units for each of parts shipped to the same customer on the basis of the shipment extraction information 62. The population arithmetic function 54 records, in the DB 63, population information 64 containing the information of the number of parts shipped to the customer.

For example, the population arithmetic function 54 obtains the number of units shipped to the same customer for each part in the equipment maintenance extraction information 59 on the basis of the equipment maintenance extraction information 59 and shipment extraction information 62.

In this embodiment, to execute analysis in detail, the population arithmetic function 54 obtains a number Ni of shipped units (population parameter) of each part shipped to the same customer during the same period on the basis of the equipment maintenance extraction information 59 and shipment extraction information 62 and records, in the DB 63, the population information 64 containing the customer name, shipment period, and the number Ni of shipped parts.

When a shipped device comprises a plurality of boards of the same type and a plurality of parts of the same type, the population arithmetic function 54 obtains the number of shipped boards by using a number obtained by multiplying the number of shipped devices by the number of boards included in each device and obtains the number of shipped parts by using a number obtained by multiplying the number of shipped devices by the number of boards and the number of parts included in each device.

The population arithmetic function 54 may directly use the equipment maintenance information 58 in place of the equipment maintenance extraction information 59 or may directly use the shipment information 61 in place of the shipment extraction information 62.

The analysis function 55 executes various kinds of reliability analysis processing.

The analysis function 55 obtains the number of defective parts until the reliability analysis time for parts shipped to the same customer during the same period on the basis of the equipment maintenance extraction information 59 and population information 64.

The analysis function 55 also obtains the number of nondefective parts which are delivered to the same customer during the same period and are currently normally working at the site without any failures on the basis of the difference between the number of shipped parts and the number of defective parts.

To calculate, e.g., the failure ratio, the analysis function 55 obtains the ratio of the number of defective parts which actually have failures to the number Ni of parts shipped to the same customer during the same period.

The analysis function 55 calculates the normal working time at the site from the difference between the analysis date/time and the shipment date/time on the basis of the equipment maintenance extraction information 59 and population information 64 and uses the calculated time as a kind of temporary aborting data.

Accordingly, the analysis function 55 can execute cumulative hazard analysis including the temporary aborting data while correctly grasping the number of parts (population) shipped to the site. As a result, in this embodiment, the failure probability at the site is prevented from being calculated larger than the actual failure probability of parts, unlike a case in which the failure probability at the site is obtained on the basis of only information related to parts with failures. Hence, more accurate analysis can be done.

The analysis function 55 records reliability analysis information 65 representing the result of reliability analysis processing in a reliability analysis information DB 66.

FIG. 29 is a view showing the first example of the reliability analysis information 65.

Referring to FIG. 29, a cumulative hazard table is created as the reliability analysis information 65. In the reliability analysis information 65, a customer name to identify a customer, part identification information representing a part shipped to the customer, a failure occurrence time when a failure has occurred in the part or normal working time when no failure has occurred in the part, σi which takes a value "1" when a failure has occurred in the part or "0" when no error has occurred, number Ni of parts (population) shipped to the same customer during the same period, 1/Ni, the value of a cumulative hazard function H(t), the value of a reliability function R(t), and the value of an unreliability function F(t) are associated with each other. Even for other customers, the reliability analysis information 65 is managed in the same format as in FIG. 29.

In this embodiment, H(t) is given by $$H(t) = \Sigma \sigma i / Ni \quad (6)$$

In equation (6), the number of defective parts in the population is calculated for parts of the same type shipped during the same period.

The reliability function R(t) and unreliability function F(t) are given by $$R(t) = \exp(-H(t)) \quad (7)$$

$$F(t) = 1 - R(t) \quad (8)$$

A Weibull function, i.e., a distribution often used for reliability analysis may be introduced.

More specifically, $LnH(t) = -Ln(Ln(1-F(t)))$ is derived from equations (6) and (8) and applied to the Weibull cumulative hazard function. By linear approximation on the two logarithmic graphs, constants $\eta$ and m are defined on the basis of $$H(t) = (t/\eta)^m \quad (9)$$

$$LnH(t) = mLnt - mLn\eta \quad (10)$$

When the Weibull function is introduced, life data in a wide range can be used so that the failure pattern of searched data can be known on the basis of the value m. That is, whether the failure pattern is an early failure type (m<1), accidental type (m=1), or abrasive type (m>1) can be known.

The failure occurrence probability density function f(t) is calculated by using "failure time" and "F(t)" of the created unreliability function data. For example, f(t) is calculated by obtaining the maximum value (F(nT)Max: n is a positive integer) of F(t) every failure occurrence time interval T and subtracting the maximum value in the preceding section from the current section (f(t)=F(nT)-F((n-1)T), for F(0)=0).

In addition, the analysis function 55 automatically creates the failure occurrence probability density function and failure occurrence frequency distribution for the population containing both the parts with failures and parts without any failures and stores the reliability analysis information 65 containing the created result in the reliability analysis information DB 66. The reliability analysis information DB 66 operates on the basis of, e.g., SQL (Structured Query Language).

After item combinations are selected, the analysis function 55 quickly automatically generates the cumulative hazard function, reliability function, unreliability function, failure occurrence probability density function, and Weibull function for each combination of desired items extracted by the information extraction function 53. Accordingly, the reliability analysis information 65 excellent in visibility can be created in a short time.

Assuming a case in which the reliability analysis result changes depending on the use location of a part even for the same industrial category or customer, the analysis function 55 accesses a use environment DB 67 on the basis of the industrial category or customer name, reads out environment information 68 representing the use environment of the part, and executes weight correction based on the environment information 68 for the unreliability or failure probability distribution of the part.

The analysis function 55 also executes feedback of failure information to the reliability of the part, failure cause diagnosis in coping with a trouble, failure tendency analysis, and failure occurrence probability density function derivation for renewal proposals.

The management function 56 searches for designated information of the reliability analysis information 65 and causes an output device 52b to display found information in accordance with the operation of the input device 52a.

The management function 56 also extracts predetermined desired information from the reliability analysis information 65 and causes the output device 52b to display the found information.

The analyzer provides the failure occurrence tendency for each part and the change of failure cause to the user of the part on the basis of the information displayed on the output device 52b.

Figure 30:
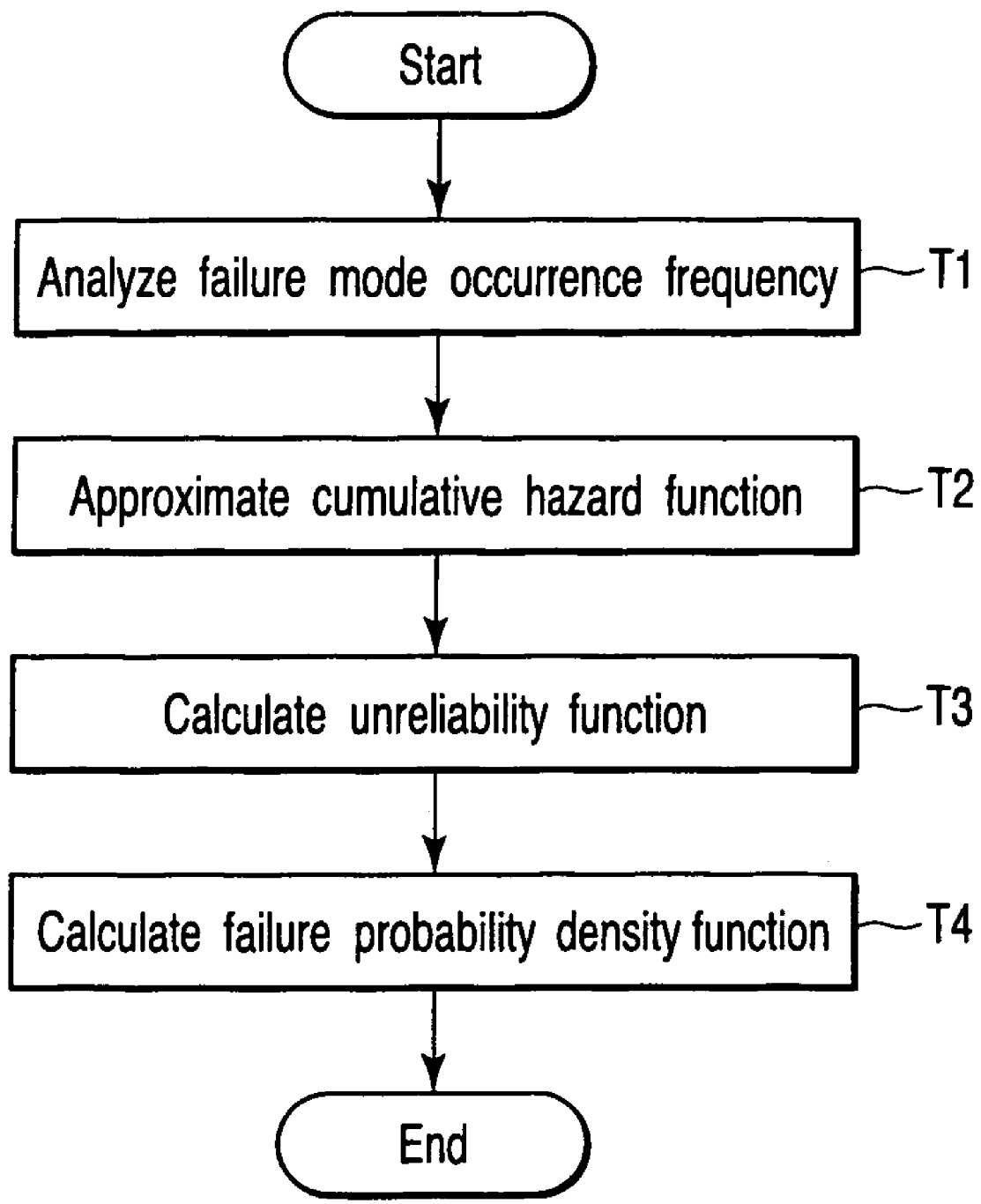
FIG. 30 is a flowchart showing an example of processing of the analysis function according to the second embodiment.

FIG. 30 is a flowchart showing an example of processing of the analysis function 55 according to the second embodiment.

In step T1, the analysis function 55 analyzes the failure mode occurrence frequency by using the population containing both parts with failures and parts which are normally working without any failures instead of obtaining the working time or unreliability on the basis of only the parts with failures.

In step T2, the analysis function 55 executes cumulative hazard function approximation by using the population. In step T3, the analysis function 55 calculates the unreliability function by using the population. In step T4, the analysis function 55 calculates the failure occurrence probability density function by using the population.

Figure 31:
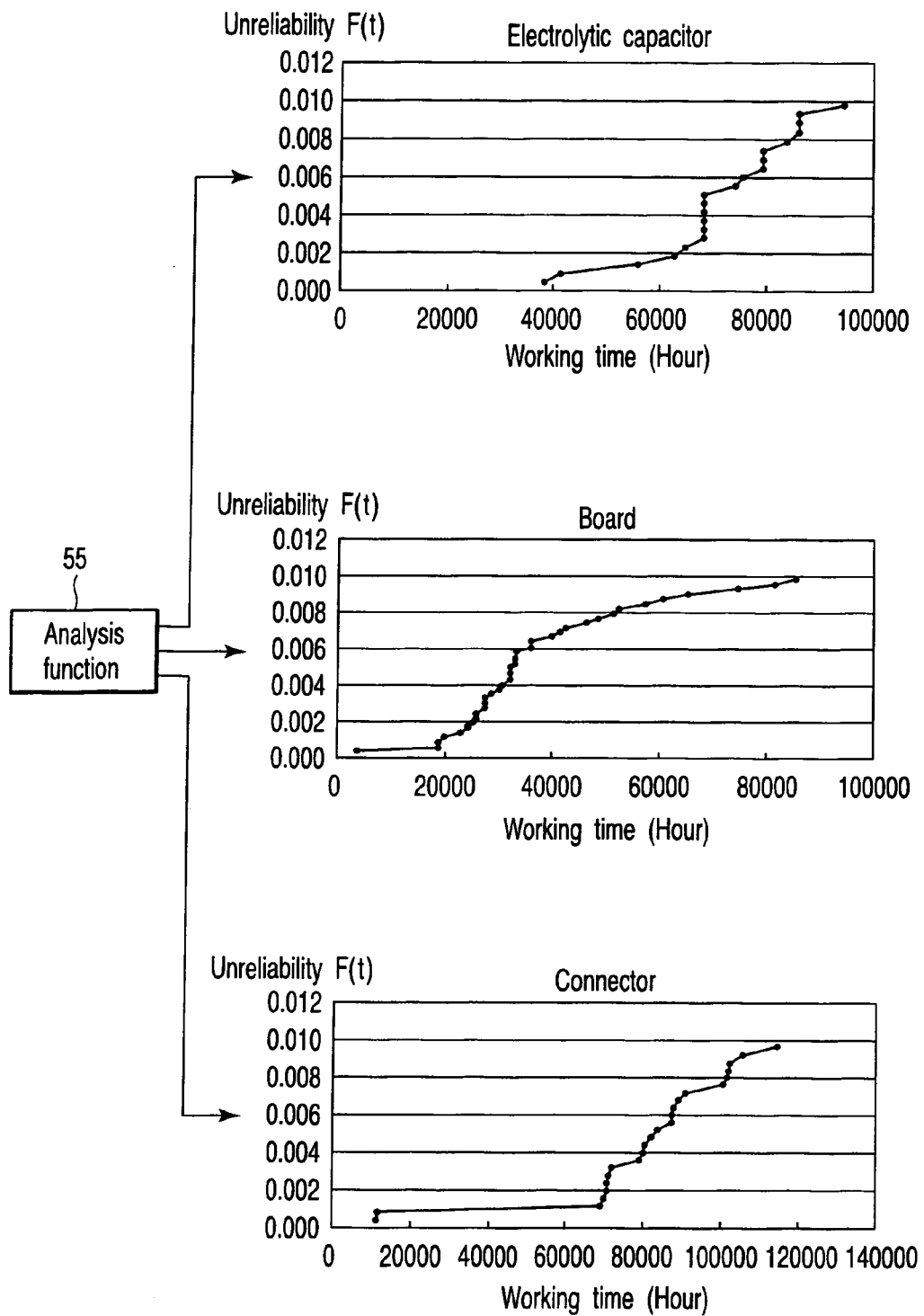
FIG. 31 is a graph showing the second example of the reliability analysis information.

FIG. 31 is a view showing the second example of the reliability analysis information 65. FIG. 31 shows the relationship between the part working time and the unreliability F(t). In this embodiment, the unreliability is obtained on the basis of the population containing both parts with failures and parts which are working without any failures instead of using only the parts with failures as the population. Hence, the value of the unreliability can be prevented from becoming too large.

Figure 32:
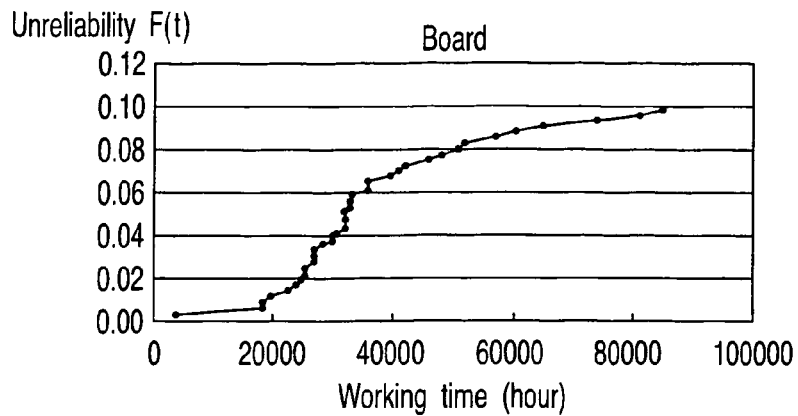
FIG. 32 is a graph showing an example of unreliability when the population contains only parts with failures.

If the unreliability is obtained by using only the parts with failures as the population, the value of the unreliability unrealistically becomes large, as shown in FIG. 32.

Figure 33:
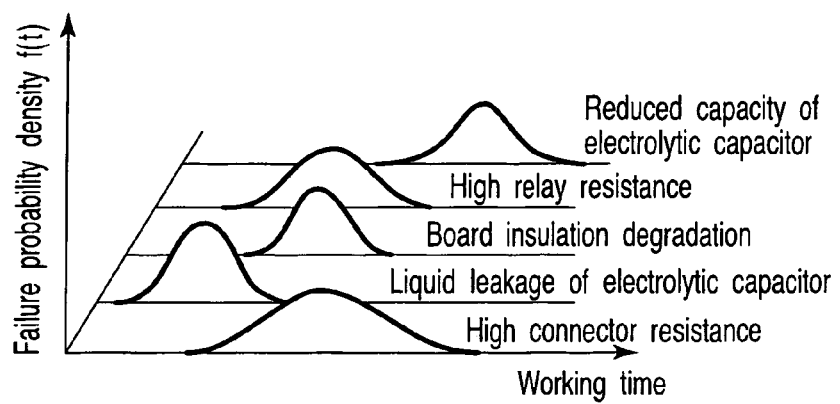
FIG. 33 is a graph showing the third example of the reliability analysis information.

FIG. 33 is a view showing the third example of the reliability analysis information 65. FIG. 33 shows the relationship between the part working time and the failure probability density f(t). FIG. 33 illustrates the change in failure probability for each defective part. Even in FIG. 33, the failure probability density is obtained on the basis of the population containing both parts with failures and parts which are working without any failures instead of using only the parts with failures as the population. Hence, the value of the failure probability density can be prevented from becoming too large.

Figure 34:
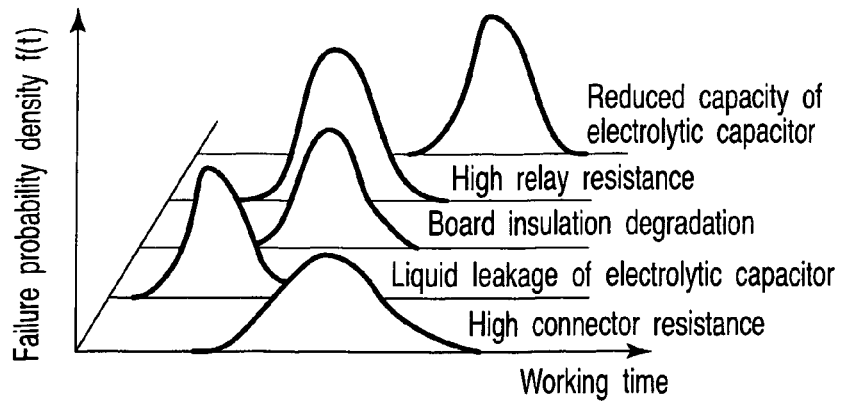
FIG. 34 is a graph showing an example of failure probability density when the population contains only parts with failures.

If the failure probability density is obtained by using only the parts with failures as the population, the value of the failure probability density unrealistically becomes large, as shown in FIG. 34.

As described above, according to this embodiment, the actual working time more accurate than that based on only defective parts can be obtained. In addition, the actual unreliability and failure probability density more accurate than those based on only defective parts can be obtained.

Accordingly, part maintenance can be prevented from being executed at an inappropriately short period obtained on the basis of only actual defective parts. Hence, part exchange at an inappropriately short period can be prevented.

In the above-described embodiment, the equipment maintenance information 58 and shipment information 61 are integrated. The reliability is analyzed by using a population containing both parts in which failures have occurred at the site and parts which are working at the site and the failure record in the population until now.

Accordingly, the failure probability is calculated by using not only the failure events but also the survival working information of the parts working at the site. Hence, the device reliability can be assessed on the basis of the actual failure condition at the site.

That is, in this embodiment, the accuracy of reliability analysis can be increased by using the equipment maintenance information 58 corresponding to the field failure data and the shipment information 61. The series of analysis operations can be executed automatically in a short time.

In this embodiment, the items of the equipment maintenance information 58 include an industrial category, customer name, system name, equipment name, model name, failure portion, failure mode, failure occurrence day, delivery day, failure occurrence time, failure cause, part name, type, and defective board name.

Accordingly, the equipment maintenance information 58 can be used as a common format for reliability analysis for devices in a wide range such as a control apparatus, computer, high-voltage device, various kinds of components, and type.

In this embodiment, the shipment information 61 contains the shipment log information of each product and also design information of various devices such as the type of each of parts included in each product and amounting count information of each type.

Hence, the number of parts incorporated in each model of a product becomes clear, and the population of survival working parts can accurately be calculated.

In this embodiment, the reliability analysis information 65 is created on the basis of the equipment maintenance information 58 and shipment information 61. For this reason, the cumulative hazard function can automatically be analyzed.

In this embodiment, information search and filtering are executed for a combination of desired items of the equipment maintenance information 58 so that only necessary pieces of information are extracted. Additionally, in this embodiment, information search and filtering are executed for a combination of desired items of the reliability analysis information 65 so that only necessary pieces of information are extracted.

For this reason, the reliability analyzer can freely extract failure information to propose part renewal to the customer or desired information such as the failure occurrence tendency for each part and the change of failure cause. The reliability analyzer can execute feedback of failure information, failure cause diagnosis in coping with a trouble, failure tendency analysis, and failure occurrence probability density function derivation for renewal proposals.

In this embodiment, after a combination of desired items is selected, the cumulative hazard function, unreliability function, and failure probability density function are quickly generated automatically for the selected combination. Accordingly, a visible reliability analysis result can be obtained in a short time.

In this embodiment, the environment information 68 is referred to on the basis of the industrial category or customer name to read out the user environment of each part. Weight correction based on the environment information 68 is done for the distribution of unreliability or failure probability density function of each part. Accordingly, even for the same industrial category or customer, a reliability analysis result which changes depending on the part working place can be obtained.

In each of the above-described embodiments, the equipment maintenance information is sometimes called device maintenance information, trouble report, field life data, or field record data.

In the embodiment, even when the item names of pieces of information are different, they can be linked as long as the items indicate the same meaning. For example, item "customer name" and item "shipment destination" can be recognized to represent a single object. Such relationship between items may be managed on, e.g., a table.

In the embodiment, t is defined as the working time for a device, part, board, product, or system. The flag σ is 1 when a failure has occurred in a device or 0 when an error has occurred. The flag σ is identifier which represents whether a device, part, board, product, or system is a defective unit or nondefective unit.

In this embodiment, actually, H(t) is calculated from data so that the unreliability or failure probability density is calculated. In the reliability analysis method according to the embodiment, the failure rate is given by $\lambda(t)=f(t)/R(t)$.

As the storage medium 2 or 51 according to the above-described embodiment, for example, a magnetic disk (e.g., a flexible disk or hard disk), optical disk (e.g., a CD-ROM or DVD), a magnetooptical disk (MO), or semiconductor memory can be used.

The storage medium 2 or 51 can employ any storage format if it is a computer-readable medium capable of storing the program 2a or 50.

The OS (Operating System) or MW (MiddleWare) such as database management software or network software, which runs on the computer, may execute part of each processing to implement the above-described embodiment on the basis of instructions of the program 2a or 50 installed from the storage medium 2 or 51 to the computer.

The storage medium 2 or 51 according to the above-described embodiment need not always be a medium independently of the computer but may include a storage medium which downloads and stores or temporarily stores the program 2a or 50 transmitted through a LAN or the Internet.

The storage medium 2 or 51 need not always include only one medium. The present invention also incorporates a case in which the processing of the above-described embodiments is executed from a plurality of media. The medium can employ any structure.

In the above-described embodiments, the computer executes each processing according to the embodiments on the basis of the program 2a or 50 stored in the storage medium 2 or 51 and can include a single apparatus such as a personal computer or a system constructed by connecting a plurality of apparatuses through a network.

The computer according to the above-described embodiments is not limited to a personal computer and also includes an arithmetic processing apparatus or microcomputer included in an information processing device. The word "computer" is used as a generic term for devices and apparatuses capable of implementing the functions according to the above-described embodiments.

The present invention is not limited to the above-described embodiments, and in practicing the present invention, various changes and modifications can be made for the constituent elements without departing from the spirit and scope of the invention. In addition, various inventions can be formed by appropriately combining the plurality of constituent elements disclosed in the above-described embodiments. For example, some of all the constituent elements disclosed in the above-described embodiments may be omitted. Constituent elements of different embodiments may appropriately be combined.

What is claimed is:

1. A maintenance support method of causing a database creation unit and a diagnosis engine to support maintenance of a device on the basis of equipment maintenance information to manage an operation record containing a working record, a failure record, and a renewal record of the device, comprising:

causing the database creation unit to create a risk assessment database in which "device part unit price", "maintenance personnel data", "labor cost unit price data", and "equipment stop loss for failure mode", which are related to the working record contained in the equipment maintenance information, and "failure mode" and "failure occurrence frequency", which are related to the failure record, are associated with identification information of the device;

causing the database creation unit to create an anti-risk measure database in which "failure mode" related to the failure record contained in the equipment maintenance information and "measure method for failure mode" related to the renewal record are associated with the identification information of the device and identification information of each part of the device;

causing the database creation unit to execute at least one of event tree analysis and failure tree analysis for each part of the device on the basis of the identification information of each part of the device and the failure mode contained in the equipment maintenance information and acquire an analysis result;

causing the database creation unit to create a failure diagnosis database in which "failure occurrence frequency", "failure sign phenomenon", and "failure cause" contained in the equipment maintenance information are associated with the identification information of the device and the identification information of each part of the device for the analysis result and each failure mode in the analysis result;

causing the diagnosis engine to refer to the risk assessment database and the anti-risk measure database before a failure occurs in the device and calculate along a time sequence a risk estimate amount in case of failure for each device on the basis of the failure occurrence frequency and the equipment stop loss;

causing the diagnosis engine to refer to the risk assessment database and the anti-risk measure database before a failure occurs in the device and calculate along the time sequence a maintenance cost in executing a measure method for each device in advance on the basis of the failure occurrence frequency, the measure method, the device part unit price, the personnel data, and the labor cost unit price data;

causing the diagnosis engine to output, as a maintenance period, a time point at which a sum obtained by adding the risk estimate amount and the maintenance cost along the time sequence is minimized; and causing the diagnosis engine to refer to the failure diagnosis database on the basis of the identification information of the device and the failure mode when a failure has occurred in the device and output at least one of a failure cause and a failure sign obtained as a result of reference.

2. A computer-readable storage medium which stores a program to be used by a database creation unit and a diagnosis engine to support maintenance of a device on the basis of equipment maintenance information to manage an operation record containing a working record, a failure record, and a renewal record of the device, the program causing a computer of the database creation unit to execute:

a function of creating a risk assessment database in which "device part unit price", "maintenance personnel data", "labor cost unit price data", and "equipment stop loss for failure mode", which are related to the working record contained in the equipment maintenance information, and "failure mode" and "failure occurrence frequency", which are related to the failure record, are associated with identification information of the device;

a function of creating an anti-risk measure database in which "failure mode" related to the failure record contained in the equipment maintenance information and "measure method for failure mode" related to the renewal record are associated with the identification information of the device and identification information of each part of the device;

a function of executing at least one of event tree analysis and failure tree analysis for each part of the device on the basis of the identification information of each part of the device and the failure mode contained in the equipment maintenance information and obtaining an analysis result; and a function of creating a failure diagnosis database in which "failure occurrence frequency", "failure sign phenomenon", and "failure cause" contained in the equipment maintenance information are associated with the identification information of the device and the identification information of each part of the device for the analysis result and each failure mode in the analysis result, and causing a computer of the diagnosis engine to implement:

a function of referring to the risk assessment database and the anti-risk measure database before a failure occurs in the device and calculating along a time sequence a risk estimate amount in case of failure for each device on the basis of the failure occurrence frequency and the equipment stop loss;

a function of referring to the risk assessment database and the anti-risk measure database before a failure occurs in the device and calculating along the time sequence a maintenance cost in executing a measure method for each device in advance on the basis of the failure occurrence frequency, the measure method, the device part unit price, the personnel data, and the labor cost unit price data;

a function of outputting, as a maintenance period, a time point at which a sum obtained by adding the risk estimate amount and the maintenance cost along the time sequence is minimized; and a function of referring to the failure diagnosis database on the basis of the identification information of the device and the failure mode when a failure has occurred in the device and outputting at least one of a failure cause and a failure sign obtained as a result of reference.

3. A medium according to claim 2, wherein the equipment maintenance information contains a model name and type of the device, a name and type of each part of the device, working days of the device and parts, a failure occurrence day, a failure reception day, a recovery day, a customer name, a site name, a device installation environment condition, the failure mode, the failure mode occurrence frequency, the failure cause, the failure sign phenomenon, a mean time between failures, a mean time to failure, a maintenance method for a target device and failure mode, a time required for maintenance, a necessary number of persons, a labor cost unit price, a customer-side equipment stop loss per unit time, and a quantity and unit price of each repair part and material.

4. A medium according to claim 2, wherein the program further causes the computer of the database creation unit to implement
　　a data mining function to extract necessary information from the equipment maintenance information to create the risk assessment database, the anti-risk measure database, and the failure diagnosis database, and
　　a reliability analysis function to execute reliability analysis on the basis of a result extracted by the data mining function, at least one of failure tree analysis and event tree analysis, and a failure probability statistic.

5. A medium according to claim 2, wherein the risk assessment database manages, for each device, a device name, a part name, an event or failure name, a probability density function of the event and failure, an equipment stop loss of the event and failure, a unit price of the model/part, an inventory, delivery day data, the maintenance personnel data, labor cost data, and customer data.

6. A medium according to claim 2, wherein the failure diagnosis database manages, for each device, at least one of an event tree analysis result and a failure analysis result of the device and part, the failure occurrence frequency of the failure mode in at least one of the event tree analysis result and the failure analysis result, the failure sign phenomenon, and the failure cause.

7. A medium according to claim 2, wherein the anti-risk measure database manages, for each device, a device name, a part name, a model, a component of the model, the failure mode, the measure method and past measure record of the failure mode, the failure cause, a use environment, and an operation situation after the measure.

8. A medium according to claim 2, wherein the program further causes the computer of the diagnosis engine to implement
　　a function of calculating a maintenance cost of a part of the device at the maintenance period,
　　a function of summing the maintenance costs of the parts of the device in a plurality of combinations to calculate a plurality of maintenance cost candidates, and
　　a function of selecting a maintenance cost candidate of a maximum amount within a maintenance budget at the maintenance period and outputting the selected maintenance cost candidate.

9. A medium according to claim 2, wherein the program further causes the computer of the diagnosis engine to implement
　　a simulation function of simulating behavior of at least one of the device and a part of the device,
　　an estimate function of activating the simulation function and estimating the failure sign phenomenon of the failure mode on the basis of designation for at least one of the device and a part of the device and the failure mode, and
　　a write function of writing the failure sign phenomenon estimated by the estimate function in the failure diagnosis database.

10. A medium according to claim 2, wherein the program further causes the computer of the diagnosis engine to implement
　　a function of writing the risk estimate amount and the maintenance cost in a memory,
　　a function of activating a financial calculation model using at least one of an NPV (Net Present Value) method and an IRR (Internal Rate of Return) method,
　　a reference function of referring to, on the basis of the financial calculation model, the memory and an external organization database which stores a discount rate in advance, and
　　a function of setting, in the financial calculation model, the risk estimate amount, the maintenance cost, and the discount rate referred by the reference function and calculating an operation cost throughout a life cycle of the device.

11. A medium according to claim 2, wherein the program further causes the computer of the diagnosis engine to implement
　　a function of correcting the risk estimate amount on the basis of an output from a sensor which detects a state of the device.

12. A maintenance support apparatus comprising a database creation unit and a diagnosis engine to support maintenance of a device on the basis of equipment maintenance information to manage an operation record containing a working record, a failure record, and a renewal record of the device,
　the database creation unit comprising:
　a section which creates a risk assessment database in which "device part unit price", "maintenance personnel data", "labor cost unit price data", and "equipment stop loss for failure mode", which are related to the working record contained in the equipment maintenance information, and "failure mode" and "failure occurrence frequency", which are related to the failure record, are associated with identification information of the device;
　a section which creates an anti-risk measure database in which "failure mode" related to the failure record contained in the equipment maintenance information and "measure method for failure mode" related to the renewal record are associated with the identification information of the device and identification information of each part of the device;
　a section which executes at least one of event tree analysis and failure tree analysis for each part of the device on the basis of the identification information of each part of the device and the failure mode contained in the equipment maintenance information and obtains an analysis result; and
　a section which creates a failure diagnosis database in which "failure occurrence frequency", "failure sign phenomenon", and "failure cause" contained in the equipment maintenance information are associated with the identification information of the device and the identification information of each part of the device for the analysis result and each failure mode in the analysis result, and
　the diagnosis engine comprising:
　a section which refers to the risk assessment database and the anti-risk measure database before a failure occurs in the device and calculates along a time sequence a risk estimate amount in case of failure for each device on the basis of the failure occurrence frequency and the equipment stop loss;
　a section which refers to the risk assessment database and the anti-risk measure database before a failure occurs in the device and calculates along the time sequence a maintenance cost in executing a measure method for each device in advance on the basis of the failure occurrence frequency, the measure method, the device part unit price, the personnel data, and the labor cost unit price data;

a section which outputs, as a maintenance period, a time point at which a sum obtained by adding the risk estimate amount and the maintenance cost along the time sequence is minimized; and a section which refers to the failure diagnosis database on the basis of the identification information of the device and the failure mode when a failure has occurred in the device and outputs at least one of a failure cause and a failure sign obtained as a result of reference.

* * * * *